US008345578B2

(12) United States Patent
Thoumy et al.

(10) Patent No.: US 8,345,578 B2
(45) Date of Patent: Jan. 1, 2013

(54) METHODS FOR CONFIGURING SENDER AND RECEIVER ANTENNAS, CORRESPONDING STORAGE MEANS AND NODES

(75) Inventors: Francois Thoumy, Vignoc (FR); Alain Caillerie, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 12/686,699

(22) Filed: Jan. 13, 2010

(65) Prior Publication Data

US 2010/0177664 A1 Jul. 15, 2010

(30) Foreign Application Priority Data

Jan. 14, 2009 (FR) ...................................... 09 50175
Jan. 14, 2009 (FR) ...................................... 09 50176
Jan. 22, 2009 (FR) ...................................... 09 50394

(51) Int. Cl.
*H04L 12/28* (2006.01)
(52) U.S. Cl. ........................................ 370/254; 370/400
(58) Field of Classification Search ........................ None
See application file for complete search history.

(56) References Cited

U.S. PATENT DOCUMENTS

| 6,442,403 | B1 | 8/2002 | Becot et al. |
| 6,498,939 | B1 | 12/2002 | Thomas |
| 6,847,997 | B1 * | 1/2005 | Kleiner .......................... 709/224 |
| 7,039,120 | B1 | 5/2006 | Thoumy et al. |
| 7,103,669 | B2 | 9/2006 | Apostolopoulos |
| 7,159,042 | B1 | 1/2007 | Morvan et al. |
| 7,839,891 | B1 * | 11/2010 | Allan ............................ 370/469 |
| 8,073,515 | B2 * | 12/2011 | Rofougaran ............... 455/575.7 |
| 2003/0228857 | A1 * | 12/2003 | Maeki ......................... 455/278.1 |
| 2006/0136603 | A1 | 6/2006 | Morvan et al. |
| 2007/0291831 | A1 * | 12/2007 | Lee et al. ....................... 375/227 |
| 2008/0064353 | A1 * | 3/2008 | McBeath et al. ............ 455/187.1 |
| 2009/0117858 | A1 * | 5/2009 | Furrer et al. ..................... 455/78 |

(Continued)

FOREIGN PATENT DOCUMENTS

EP 1850503 A1 12/2004

(Continued)

OTHER PUBLICATIONS

French Search Report dated Sep. 3, 2009 in corresponding French Application No. FR 0950176.

(Continued)

*Primary Examiner* — Robert Wilson
(74) *Attorney, Agent, or Firm* — Fitzpatrick, Cella, Harper & Scinto

(57) ABSTRACT

Methods for configuring antennas of first and second nodes of a wireless communications network clocked by transmission cycles, each cycle being divided into time slots, the first node and second nodes having first and second time slots for transmitting data in the first mode, the first node having a third time slot for transmitting data to the second node in a second mode, are proposed. The configuring method, on the second node side, comprises steps of determining a receiving configuration of the antenna of the second node, verifying that the determined receiving configuration is invariant, relative to a receiving configuration previously used for receiving data transmitted from the first node to the second node in the second mode; in the event of negative verification: sending a predetermined signal in the second mode, by using a sending configuration that is determined based on the determined receiving configuration; configuring, during the third time slot, the antenna of the second node by using this determined receiving configuration.

22 Claims, 11 Drawing Sheets

U.S. PATENT DOCUMENTS

2009/0146895 A1\* 6/2009 Drexler et al. ............... 343/757
2010/0054229 A1 3/2010 Thoumy et al.
2010/0177664 A1\* 7/2010 Thoumy et al. ............... 370/254

FOREIGN PATENT DOCUMENTS

WO 2004/054135 A1 6/2004
WO 2008/112849 A2 9/2008

OTHER PUBLICATIONS

U.S. Appl. No. 12/596,415, filed Apr. 5, 2010. Applicants: Lionel Tocze, et al.

\* cited by examiner

METHODS FOR CONFIGURING SENDER AND RECEIVER ANTENNAS, CORRESPONDING STORAGE MEANS AND NODES

1. FIELD OF THE INVENTION

The field of the invention is that of communications systems and more particularly wireless communications systems using millimeter radiowave sender and receiver antennas such as for example wireless home networks or WPANs (wireless personal area networks) using the 60 GHz bandwidth.

More specifically, the invention concerns a technique for configuring sender and receiver antennas in a wireless communications network implementing a synchronous time division multiplexing (TDM) type of transmission.

2. TECHNOLOGICAL BACKGROUND 2.1 Context of the Invention

Wireless home audio and video applications are now increasingly numerous and require ever higher data bit rates of the order of some Gigabits per second (here below denoted as Gbps) and an increasingly higher quality of service. WPAN millimeter type home networks are particularly well suited to this type of application. Indeed, the authorized band about a carrier frequency of 60 GHz offers a wide bandwidth thus enabling the transportation of a large quantity of data. Besides, the radio range of such systems is limited to about ten meters, favoring the re-utilization of the frequencies in time and space.

The physical properties of the carrier bandwidth around 60 GHz and the regulatory ceiling on the power of the sender devices (or nodes) are currently limiting communications to a maximum of about ten meters.

Moreover, in this carrier frequency band, the attenuation of the radio signal in air is great.

In practice, in order to obtain high quality radio communications and sufficient radio range without needing to send at unauthorized power values, these characteristics make it necessary for the nodes of a home wireless network to have antennas configured directionally (or selectively) with high positive gain.

More particularly, antennas of this type, called "smart antennas" can be used to reach the distances required by audio and video applications within home networks. A "smart antenna" is constituted by an array of radiating elements distributed in a matrix on a given support. This network enables the implementing of a beamforming technique. In this technique, each radiating element of the antenna is electronically controlled in phase and power (or gain) to obtain a swiveling beam of varying narrowness when sending and/or receiving. The use of this type of antenna at reception of a radio signal increases the sensitivity of the antenna in reception in a desired direction and reduces the sensitivity of this antenna in areas of interference or highly noisy areas. The use of this type of antenna during the transmission of a radio signal increases the power of the radio signal in the desired direction.

In meshed communications networks, when a node sends out a radio signal (in sending mode), its smart antenna is adjusted to send out a wide radiating beam (wided angle of antenna radiation) so as to reach a maximum number of receiver nodes. When a node receives a radio signal (in reception), its smart antenna is regulated to receive data in a narrow and orientable antenna angle in order to increase the gain of the antenna and direct it to the node that has sent the radio signal.

In reception mode, each receiver node aims its reception antenna at an angle of orientation adapted to receiving data coming from the sender node. At each new sender node, each receiver node must therefore orient or aim its reception antenna according to a new angle of orientation adapted to the position of the new sender node in the network.

The search for an optimum angle of antenna orientation is a recurrent technical problem in antenna communications networks configured directionally. In a network where the exact positions of the devices are not known reliably, it is often necessary to carry out an exhaustive scanning of the coverage area of the antenna in reception mode in order to select an optimum angle of orientation for the receiving antenna for a communication link-up considered. The implementation of such an antenna scanning is especially necessary in WPAN home communications systems. Indeed, owing to the short wavelengths used (millimeter waves) such communications systems are highly sensitive to phenomena of interference and shadowing.

The drawback of such a method lies in the fact that it cannot be implemented during a communications link-up. Indeed, such a method requires the receiver nodes of the network to orient their receiver antenna and scrutinize in directions other than the one needed for receiving payload data sent out by a sender node considered, thus giving rise to a loss of payload data during this period of time.

The time division multiple access (TDMA) protocol is a protocol for a multiplexing mode used to transmit several signals on one and the same communications channel. This is time division multiplexing that relies on the principle of a division of the time domain into access sequences (more commonly called TDM network cycles) each access sequence into several time slots or speech times which are allotted successively to the different devices of the network. Each node of the network can therefore send out data in turn on a same radio communications channel, the other nodes being then either in a mode of operation for receiving data or in another mode of operation that does not disturb the radio communications channel, such as for example the standby mode.

The meshed communications systems (called mesh networks) implementing a TDMA protocol of this kind may rely classically on the presence of a master device responsible for setting up network connections, synchronizing the speech time of each of the nodes of the network and arbitrating on access to the shared wireless medium.

The meshed communications systems implementing transmission of data on the network according to a transmission redundancy mode are formed by a set of nodes communicating together through a plurality of communications paths. In mesh networks of this kind, a data content transmitted by a sender node may take different communications paths. In this way, a receiver node, which is an intended recipient of this data content, may therefore receive numerous copies of this same content of original data through different communications paths. This particular property is taken advantage of in certain communications systems to improve the reliability of the data received. For example, if a receiver node receives three copies of a same data content, this node may decide to select the faithful copies on the basis of the number of identical copies received.

Besides, the use of an error correction method is common in communications systems. Indeed, an error correction method for this kind makes it possible to obtain the maximum capacity of data transport from a transmission carrier. It furthermore makes it possible to characterize the error rate of the transmission channel and know its maximum value.

An error correction method of this kind can also include a mechanism to detect erasures (or missing symbols) by setting up correlations between each of the copies (of a same data content) received by a node that is the destination of the data content considered.

The redundancy of transmissions required for the meshing of a mesh communications network is implemented successively in time on a same radio communications channel. Indeed, when a sender node sends data on the radio communications channel, this data is received by the different nodes of the network, which are then playing the role of receiver nodes (i.e. working in reception node). These receiver nodes then re-send the data; preliminarily received from the sender node, taking turns according to the speech time slots allotted to them. Depending on the structure of the mesh of the network implemented, the data can be repeated from one to N times on the radio communications channel, N representing the number of nodes of the network.

Moreover, the implementing of a data transmission on a mesh communications network according to a transmission redundancy mode may prove to be particularly efficient in guaranteeing good reception beyond a predefined residual error rate. This technique is particularly well suited to applications requiring low bandwidth (of the order of about 10 Mbps) such as the transmission of audio data or control data for example.

However, because of a bandwidth that is generally limited for such home networks, the redundancy of transmissions applied in these mesh communications networks prove to be ill-adapted to applications calling for a data stream at a higher bit rate (of the order of about 100 Mbps) such as video applications for example. For this type of application, it thus proves to be more worthwhile to envisage only a single transmission of data on the network and implement an technique for adaptive routing of communications sensitive to the disturbances of the network, depending on the positions of the devices of the network and the sources of disturbance (shadowing, interference etc) preliminarily detected in the coverage area of the sending and reception antennas. Several alternative communications paths may therefore be used so as to enable an adaptation of the routing of the communications, the nodes of the network adapting the choice of the communications paths to the instantaneous disturbances of the network.

Communications paths of this kind can be set up in line-of-sight mode, namely aligned or in non-line-of-sight mode between a sender device and a receiver device of the network.

Here below, the term "aligned communication" or "line-of-sight communication" is understood to mean a communications link-up (or generally the setting up of a communications link-up) for which the receiver device parameterizes its antenna in reception so as to aim the direction of the sender device.

Here below, the term "non-line-of-sight communication" is understood to mean a communications link-up (or generally the setting up of a communications link-up) for which the receiver device parameterizes its antenna in reception so as to aim in a direction other than that of the sender device.

In the case of a non-aligned or non-line-of-sight communication, the routing of the data between the sender and receiver devices of the network through a communications path brings into action a relay node, which could be active, i.e. implementing a data relay adjusted in accordance with a predefined transmission protocol (authorizing a deferred relaying of the data received) or passive transmission, i.e. implementing a relaying of the data by reflection of the signal carrying the received data.

The devices working as active relays of the network are generally known to all the other devices of the network. These are in fact devices of the network having a particular function of data relays.

The passive relays for their part are not necessarily known to the devices of the network. This type of relay in fact does not have any means of communication with the other devices of the network because it does not have any sender or receiver antennas. It may be a wall or an object having reflective capacities such as a plate or a metal bar for example.

2.2 Technical Problem of the Invention

One of the main difficulties encountered when implementing a WPAN type home communications network based on a TDMA protocol and on directionally configured antennas is that of being able to swiftly and reliably determine the antenna orientation angles of a sender node and a receiver node so as to ensure constantly high quality communications of data in point-to-point transmission between these nodes.

The optimum aiming of an antenna in a given direction is generally difficult to maintain over time owing to the short radio wavelengths used in these wireless communications systems. Indeed, the smallest shift by the nodes of the network or a variation in the aiming precision due for example to a drift in temperature or an ageing of certain electronic components may affect the quality of a radio communications link-up.

This technical problem is particularly worrisome in the case of certain communications, especially involving data streams at high bit rates, which allow neither transmission redundancy nor a use of the bandwidth to carry out optimal aiming of the antennas of each node.

2.2 Prior-Art Approaches

There already exist various methods for adjusting antenna orientation angles in the prior art.

A known technique presented in the American patent document U.S. Pat. No. 6,498,939 (Texas instrument) proposes a method for adjusting the antenna orientation angles of a wireless communications system based on a measurement of the quality of the signal received by a receiver node through a first communications path (conveying applications data) and a transmission of control data via a second communications path independent of the first communications path.

One drawback of this prior art technique is that it makes it necessary to set up an additional communications path, namely a communications path other than the one used to transmit applications data, to obtain an adequate adjustment of the antenna orientation angles. Such a method therefore generates additional costs and complexity of implementation.

Another drawback of such a technique is that it cannot be used to ensure lossless transmission of application data, because the antenna adjustments cannot be done before each operation for sending application data, which is especially true in the specific case of transmission of data at high bit rates in a communications network supporting a highly fluctuating radio communications channel.

3. GOALS OF THE INVENTION

The invention in at least one embodiment is aimed especially at overcoming these different drawbacks of the prior art.

More specifically, it is a goal of at least one embodiment of the invention to provide a technique for updating antenna parameters of two nodes (a sender and a receiver) when they are involved in transmission in point-to-point mode in a wireless communications network should said network also enable transmission in another mode (for example with redundancy of transmissions) having an antenna radiation angle greater than that of the point-to-point mode.

It is another goal of at least one embodiment of the invention to provide a technique of this kind that makes it possible to set up point-to-point communications between two apparatuses continuously as and when the transmission cycles (network cycles) occur, despite disturbances liable to affect the quality of the transmission in point-to-point mode.

It is another goal of at least one embodiment of the invention to provide a technique of this kind to provide for optimum readjustment of angular antenna parameters as a function of disturbances of the network liable to affect the quality of transmission in point-to-point mode.

It is a complementary goal of at least one embodiment of the invention to provide a technique of this kind to anticipate transmission in point-to-point mode in order to avoid situations where the bandwidth allocated to the transmission of effective data according to the point-to-point mode is used for the benefit of operations to readjust the angular antenna parameters.

It is yet another goal of at least one embodiment of the invention to provide a technique of this kind that relies solely on means classically used for transmitting data within a wireless communications network.

It is also a goal of the present invention to provide a technique of this kind that is simple to implement and costs little.

4. SUMMARY OF THE INVENTION

One particular embodiment of the invention proposes a method for configuring antennas of first and second nodes of a wireless communications network clocked by transmission cycles, the first node and the second node transmitting data in a first mode, the method being carried out in sight of a transmission from the first node to the second node in a second mode, the first mode having an antenna radiation angle greater than that of the second mode. The second node performs steps of:
  determining a receiving configuration of the antenna of the second node;
  verifying that the determined receiving configuration has not substantially changed (i.e. is invariant), relative to a receiving configuration previously used for receiving data transmitted from the first node to the second node in the second mode;
and in the event of a negative verification:
  sending a predetermined signal in the second mode, by using a sending configuration that is determined based on the determined receiving configuration;
  configuring the antenna of the second node by using said determined receiving configuration.

The general principle of this embodiment of the invention therefore consists in taking advantage of data transmission in a first mode (for example a redundancy of transmissions) in a wireless mesh communications network to determine an optimum angle of antenna aim (or more generally possible parameters of antenna configuration) of a first node (sender of point-to-point transmission) and a second node (receiver of the point-to-point transmission) making it possible to ensure sufficient quality of data transmission in a second mode (point-to-point mode) between these nodes.

This embodiment of the invention relies on a wholly novel and inventive approach to the dynamic readjustment of antenna configuration parameters such as parameters representing a (dominant) orientation of the antenna upon detection of a change in conditions of propagation between these nodes. Indeed, it is the second node which, having detected a change in conditions of propagation during a communication link-up other than that of the point-to-point transmission considered, initiates a reconfiguration of point-to-point transmission (in the form of a predetermined signal) in order to call upon the first node to make an readjustment of the antenna angle parameters.

Since such an initiation of configuration is done during transmission in the first mode (for example with transmission redundancy), a reconfiguration of point-to-point transmission can be done without having to use the bandwidth reserved for transmitting data in the point-to-point mode and therefore makes it possible to maintain data transmission according to the point-to-point mode from the first node to the second node at each transmission cycle despite changes in conditions of propagation between these nodes.

Preferably, each transmission cycle comprises a first phase with redundancy of transmissions in the first mode and a second phase with point-to-point transmission in the second mode.

Thus, the loss of information of the nodes involved in a reconfiguration of point-to-point transmission is compensated for by the function of the transmissions redundancy mode. Indeed, through a principle of relaying by network meshing, said involved nodes could subsequently receive the data intended for them through relay nodes during the time slots that follow the time slots devoted to the request for reconfiguring the point-to-point transmission.

Advantageously, a receiving configuration belongs to the group consisting of:
  an angle of antenna orientation in reception;
  a piece of information representing an angle of antenna orientation in reception;
  pieces of information on gain and phase of each elementary antenna of an array of antennas forming the antenna of the second node accentuating the sensitivity in reception of said antenna at a given angle of orientation.

This list is not exhaustive.

The term "receiving configuration parameters" is understood to mean any piece of information used to define at least one angle of antenna aim (or orientation) in reception for point-to-point transmission as a function of the referential system used to define this aim (or orientation). The term "angle of aim" (or "angle of orientation") is understood to mean a direction for which the sensitivity of the antenna is accentuated.

Advantageously, the method is implemented upon positive verification of a condition belonging to the group consisting of:
  detecting a change of transmission cycle;
  detecting a predetermined duration, starting from a predetermined event, has elapsed;
  detecting a level of quality of reception of data sent by the first node below a predetermined threshold.

The method can therefore update the angular antenna parameters:
  either systematically at each network cycle;
  or periodically, i.e. according to a time-out corresponding to a defined number of network cycles;
  or again upon detection of an insufficient level of quality of communication between first and second nodes involved in the point-to-point transmission.

The latter case thus averts any untimely application of the method for configuring, i.e. for example when a readjustment of the antenna parameters is unnecessary.

According to an advantageous characteristic, said step of determining a receiving configuration comprises steps of:
  scanning, at reception, a plurality of angles of antenna orientation;
  obtaining a level of quality of reception associated with each of said angles of antenna orientation;
  determining said receiving configuration by selecting a configuration corresponding to an angle of antenna orientation, from among said plurality of angles, for which the associated level of quality of reception is the best.

For the point-to-point transmission considered, the invention selects a new communications path for which the level of reception quality is the highest.

It must be noted that an alternative path may be set up alignedly (i.e. in a line-of-sight mode) or non-alignedly (a non-line-of-sight mode) implying for example in the latter case a reflecting obstacle.

Preferably, in the event of a positive verification, the method comprises steps of:
  sending preliminarily received data and/or new data in the first mode;
  configuring the antenna of the second node by using said receiving configuration, previously used for receiving data transmitted from the first node to the second node in the second mode.

Thus, should a readjustment of the antenna parameters (in other words an antenna reconfiguration) for a point-to-point transmission be unnecessary (because no particular disturbance appears to be present in the common coverage area of the receiver and sender antennas), the invention provides for using the working of the transmission redundancy mode (with relaying by network meshing) so that the nodes concerned carry out their data relaying function during the time slot normally planned for this purpose and thus reinforce the robustness of the communications between the nodes of the network.

Another particular embodiment of the invention proposes a method for configuring antennas of first and second nodes of a wireless communications network clocked by transmission cycles, the first node and the second node transmitting data in a first mode, to the method being carried out in sight of a transmission from the first node to the second node in a second mode, the first node having an angle of antenna radiation greater than that of the second mode. The first node performs steps of:
  verifying the detection of a signal sent by the second node by using a receiving configuration of the antenna of the first node previously used for receiving data transmitted by the second node in the first mode;
in the event of negative verification:
  obtaining a receiving configuration of the antenna of the first node by detecting, in the second mode, a predetermined signal;
  configuring the antenna of the first node by using a new sending configuration of the antenna of the first node determined on the basis of the receiving configuration obtained.

On the first node (sender of the point-to-point transmission) side, an absence of data signal, detected during the time slot reserved for the second node (receiver of the point-to-point transmission) to transmit according in the first mode means that a reconfiguration of the point-to-point transmission is initiated by the second node. The first node then orients its reception antenna so as to receive a predetermined signal, sent by the second node, which is put to use to carry out a readjustment of its angular antenna parameters for the point-to-point transmission.

Preferably, each transmission cycle comprises a first phase with redundancy of transmissions in the first mode and a second phase with point-to-point transmission in the second mode.

Thus, the loss of information of the nodes involved in a reconfiguration of a point-to-point transmission is compensated for by the function of the transmission redundancy mode. Indeed, through a principle of relaying by network meshing, said involved nodes could subsequently receive data intended for them through relay nodes during time slots following the time slots devoted to the request for configuration of the point-to-point transmission.

Advantageously, a sending configuration belongs to the group consisting of:
  a sending antenna orientation angle;
  a piece of information representing an angle of sending antenna orientation;
  a piece of information on gain and phase of each elementary antenna included in an antenna network constituting the antenna of the first node accentuating the radiation of said antenna according to a given orientation angle.

This list is not exhaustive.

The term "sending configuration parameters" is understood to mean any piece of information used to define at least one angle of aim (or orientation) of a sending antenna for the point-to-point transmission as a function of the reference system used to define this aim (or this orientation). The term angle of aim (or orientation) is understood to mean a direction for which the sensitivity of the antenna is accentuated.

Another particular embodiment of the invention proposes a computer-readable storage means, storing a computer program comprising a set of instructions executable by a computer to implement a method for configuring antennas of first and second nodes of a wireless communications network clocked by transmission cycles, the first node and the second node transmitting data in a first mode, the method being carried out in sight of a transmission from the first node to the second node in a second mode, the first mode having an antenna radiation angle greater than that of the second mode, the following steps being performed by the second node when said set of instructions is executed:
  determining a receiving configuration of the antenna of the second node;
  verifying that the determined receiving configuration is invariant, relative to a receiving configuration previously used for receiving data transmitted from the first node to the second node in the second mode;
and in the event of a negative verification:
  sending a predetermined signal in the second mode, by using a sending configuration that is determined based on the determined receiving configuration;
  configuring the antenna of the second node by using said determined receiving configuration.

Another particular embodiment of the invention proposes a computer-readable storage means, storing a computer program comprising a set of instructions executable by a computer to implement a method for configuring antennas of first and second nodes of a wireless communications network clocked by transmission cycles, the first node and the second node transmitting data in a first mode, the method being carried out in sight of a transmission from the first node to the second node in a second mode, the first mode having an antenna radiation angle greater than that of the second mode, the following steps being performed by the first node when said set of instructions is executed:
  verifying the detection of a signal sent by the second node by using a receiving configuration of the antenna of the first node previously used for receiving data transmitted by the second node in the first mode;
in the event of negative verification:
  obtaining a receiving configuration of the antenna of the first node by detecting, in the second mode, a predetermined signal;
  configuring the antenna of the first node by using a new sending configuration of the antenna of the first node determined on the basis of the receiving configuration obtained.

One particular embodiment of the invention proposes a second node of a wireless communications network clocked by transmission cycles and comprising at least a first node, the first node and the second node transmitting data in a first mode, a transmission of data in a second mode from the first node to the second node having to be established, the first mode having an antenna radiation angle greater than that of the second mode, the second node comprising:
  first determining means for determining a receiving configuration of the antenna of the second node;
  first verifying means for verifying that the determined receiving configuration is invariant, relative to a receiving configuration previously used for transmitting data between the first and second nodes in the second mode;
  first sending means for sending a predetermined signal in the second mode, by using a sending configuration that is determined on the basis of the determined receiving configuration;
  first configuring means for configuring the antenna of the second node by using said determined receiving configuration,
said first sending and first configuring means being activated in case of negative verification by said first determining means.

Preferably, each transmission cycle comprises a first phase with redundancy of transmissions in the first mode and a second phase with point-to-point transmission in the second mode.

Advantageously, a receiving configuration belongs to the group consisting of:
  an angle of antenna orientation in reception;
  a piece of information representing an angle of antenna orientation in reception;
  pieces of information on gain and phase of each elementary antenna of an array of antennas forming the antenna of the second node accentuating the sensitivity in reception of said antenna at a given angle of orientation.

Advantageously, it comprises second means for verifying a condition belonging to the group consisting of:
  a change of transmission cycle;
  a flow of a predetermined duration starting from a predetermined event;
  a level of quality of reception of data sent by the first node below a predetermined threshold.
said first means for determining being activated if said second means for verifying verify a condition.

According to an advantageous characteristic, said first means for determining a receiving configuration comprise:
  means for scanning, at reception, a plurality of angles of antenna orientation;
  means for obtaining a level of quality of reception associated with each of said angles of antenna orientation;
  second means for determining said receiving configuration by selecting a configuration corresponding to an angle of antenna orientation, from among said plurality of angles, for which the associated level of quality of reception is the best.

Preferably, the second node comprises the following means, activated in the event of positive verification by said first verifying means:
  second means for sending preliminarily received data and/or new data in the first mode;
  second means for configuring the antenna of the second node by using said receiving configuration, previously used for receiving data transmitted from the first node to the second node in the second mode.

Another particular embodiment of the invention proposes a first node of a wireless communications network clocked by transmission cycles and comprising at least a second node, the first node and the second node transmitting data in a first mode, a transmission of data in a second mode from the first node to the second node having to be established, the first mode having an angle of antenna radiation greater than that of the second mode, the first node comprising:
  verifying means for verifying the detection of a signal sent by the second node by using a receiving configuration of the antenna of the first node previously used for receiving data transmitted by the second node in the first mode;
  obtaining means for obtaining a receiving configuration of the antenna of the first node by detecting, in the second mode, a predetermined signal;
  configuring means for configuring the antenna of the first node by using a new sending configuration of the antenna of the first node determined on the basis of the receiving configuration obtained;
said obtaining and configuring means being activated in the event of negative verification by said verifying means.

Preferably, each transmission cycle has available a first phase with redundancy of transmissions in the first mode and a second phase with point-to-point transmission in the second mode.

Advantageously, a sending configuration belongs to the group consisting of:
  a sending antenna orientation angle;
  a piece of information representing an angle of sending antenna orientation;
  a piece of information on gain and phase of each elementary antenna included in an antenna network constituting the antenna of the first node accentuating the radiation of said antenna according to a given orientation angle.

5. LIST OF FIGURES

Other features and advantages of the invention shall appear from the following description, given by way of an indicative and non-restrictive example and from the appended drawings, of which:

Figure 3:
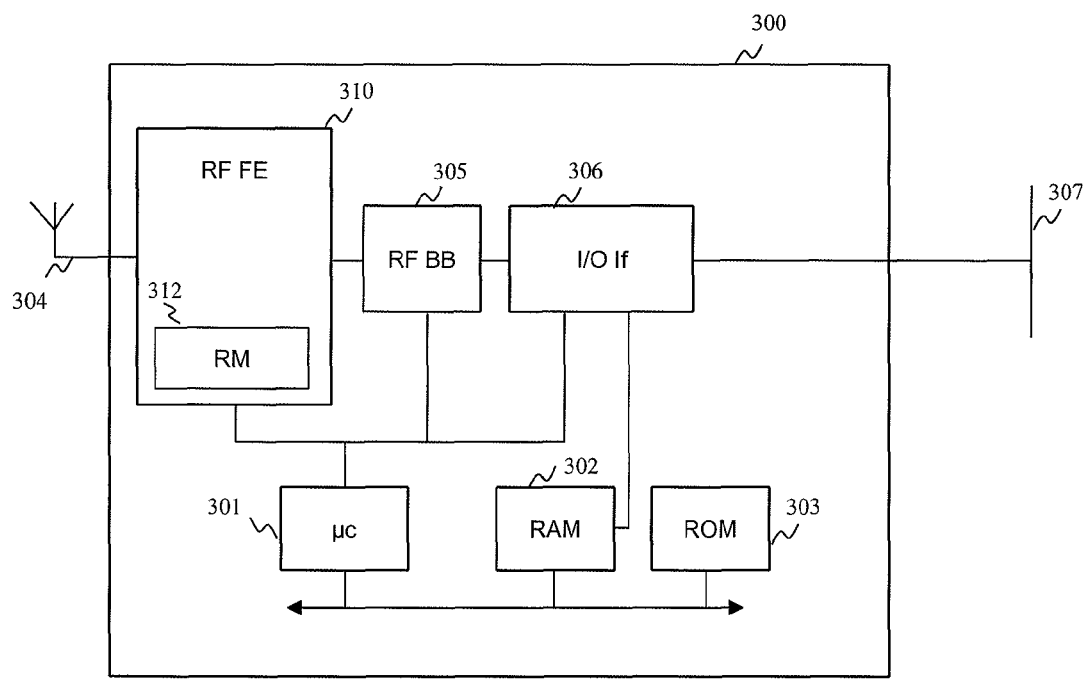
Figure 4A:
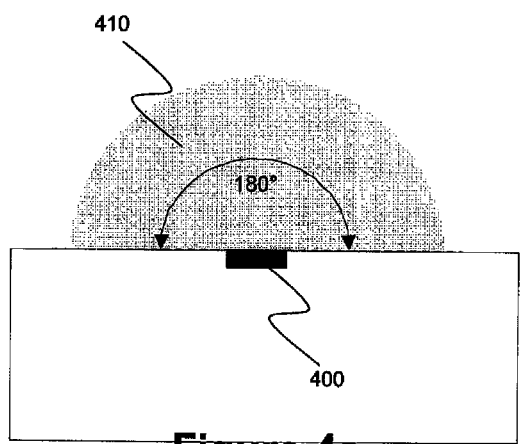
Figure 4B:
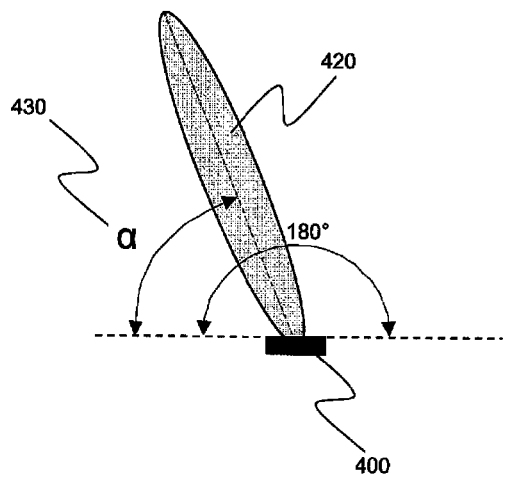
Figure 5:
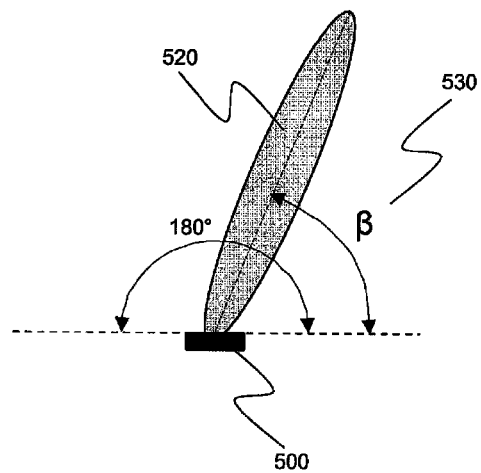
Figure 6A:
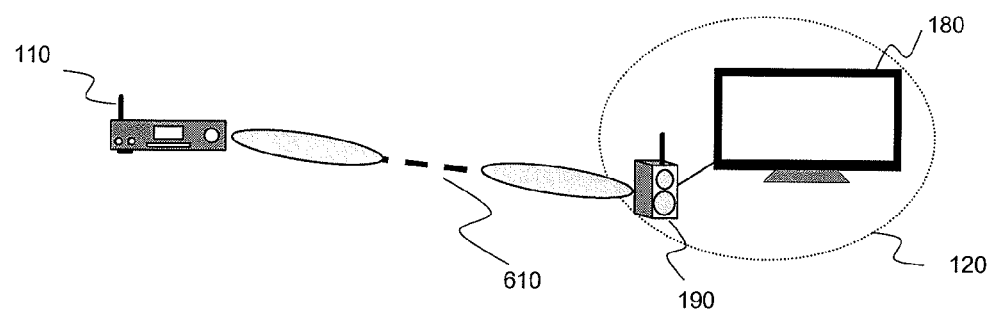
Figure 6B:
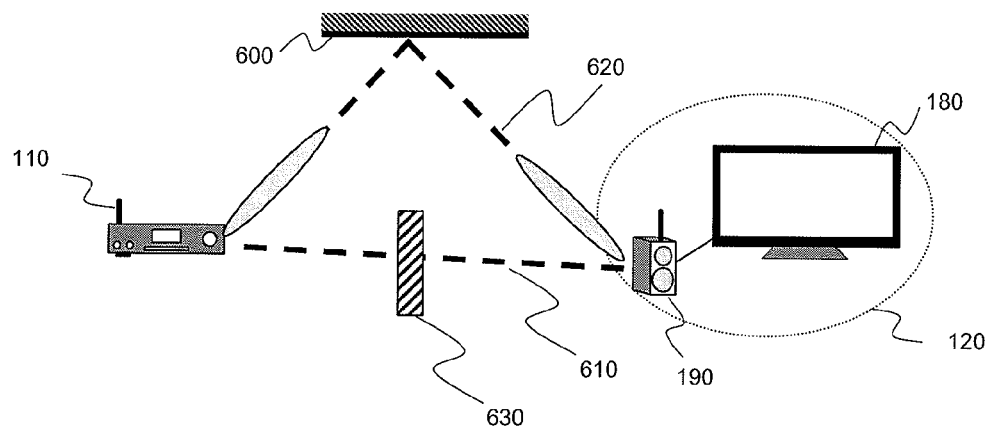
Figure 7A:
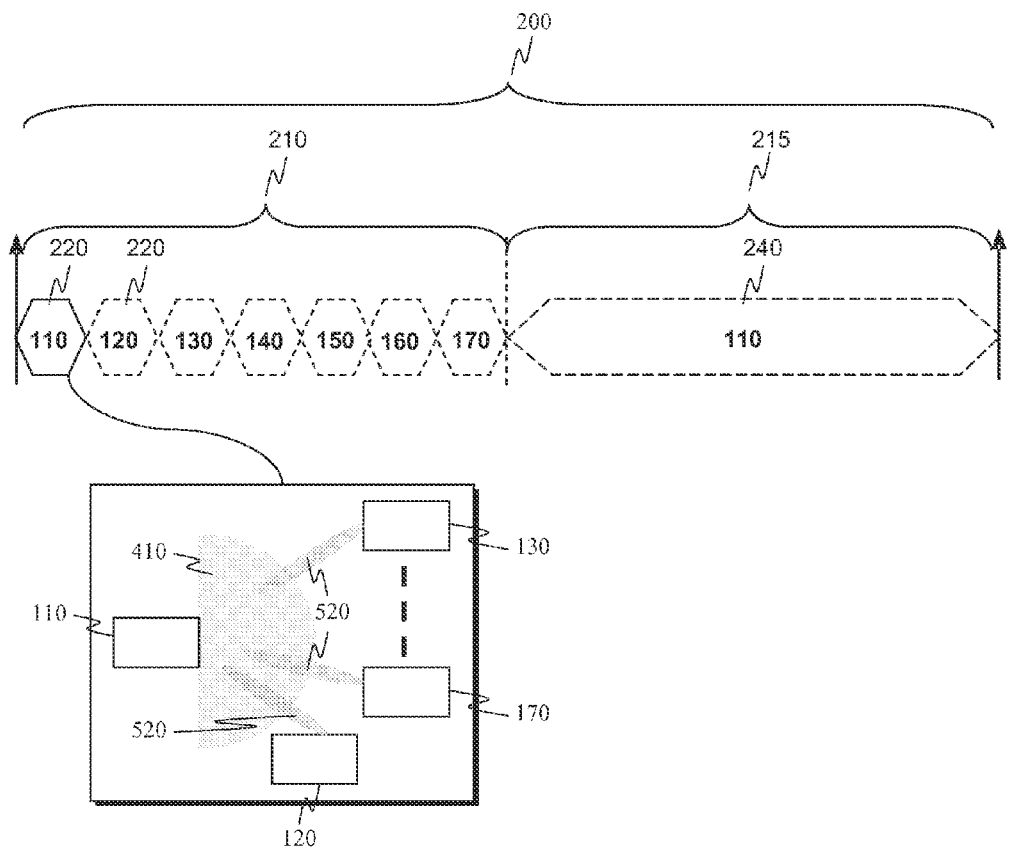
Figure 7B:
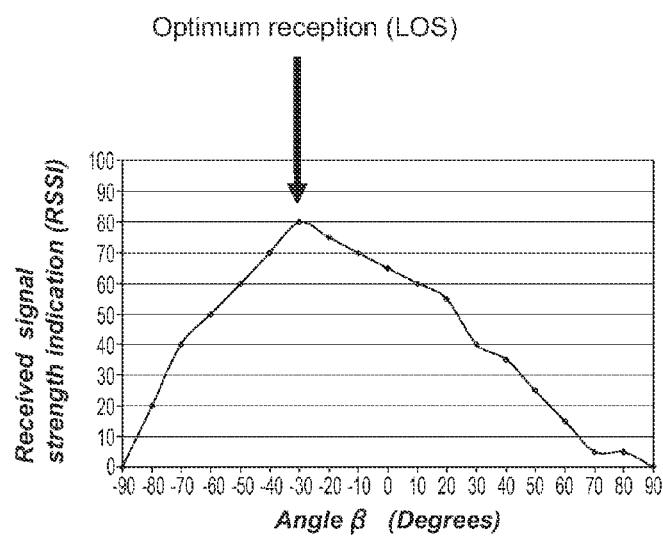
Figure 8A:
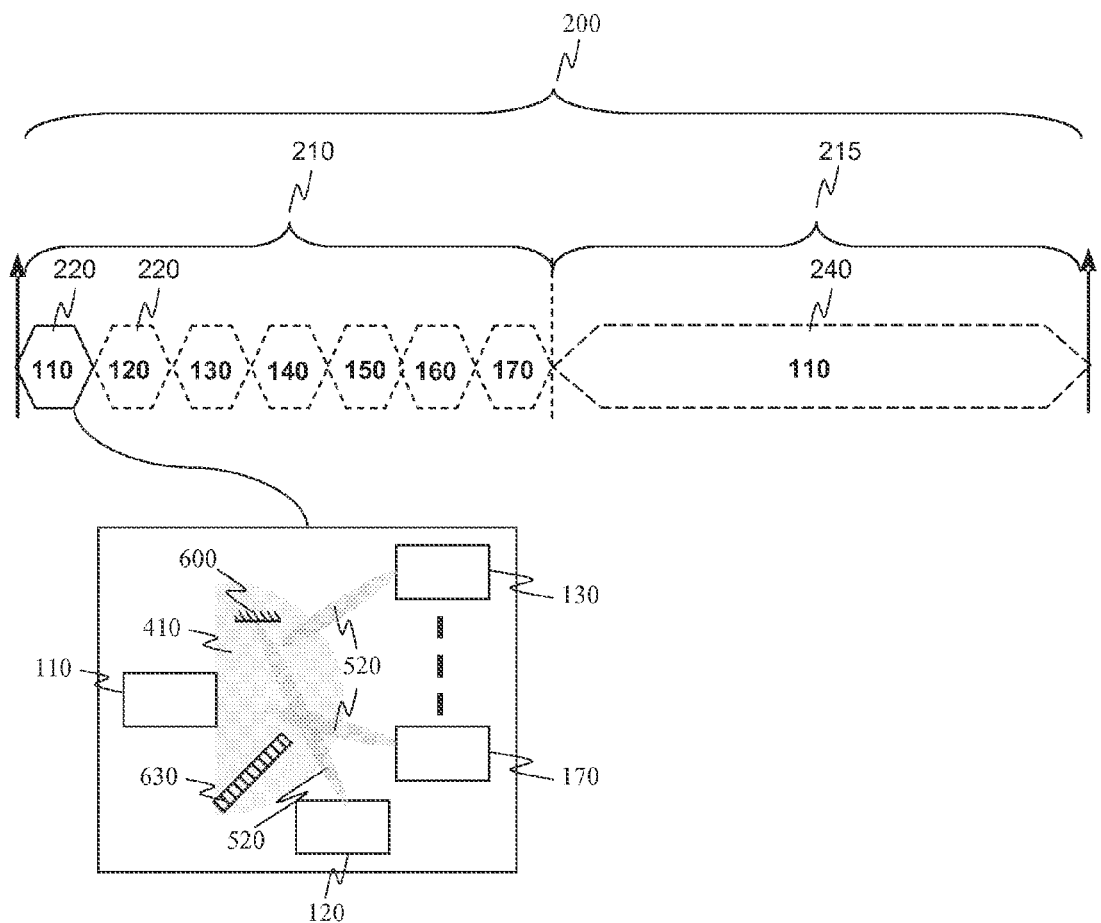
Figure 8B:
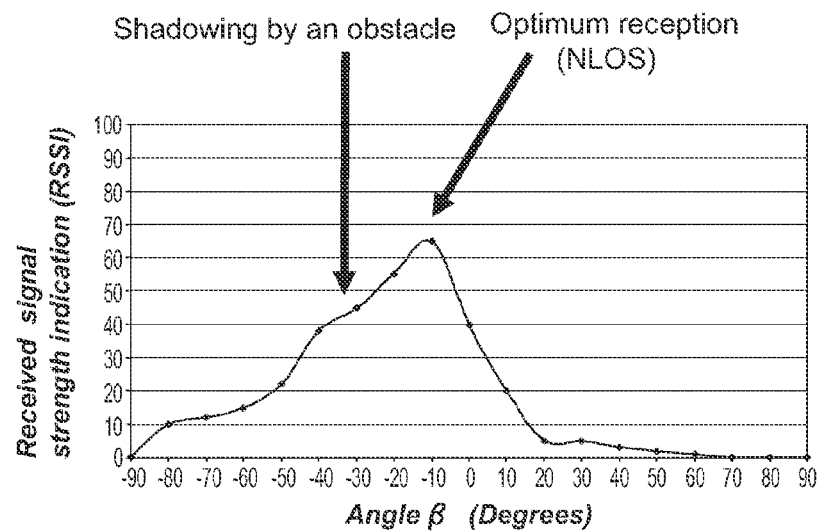
Figure 9A:
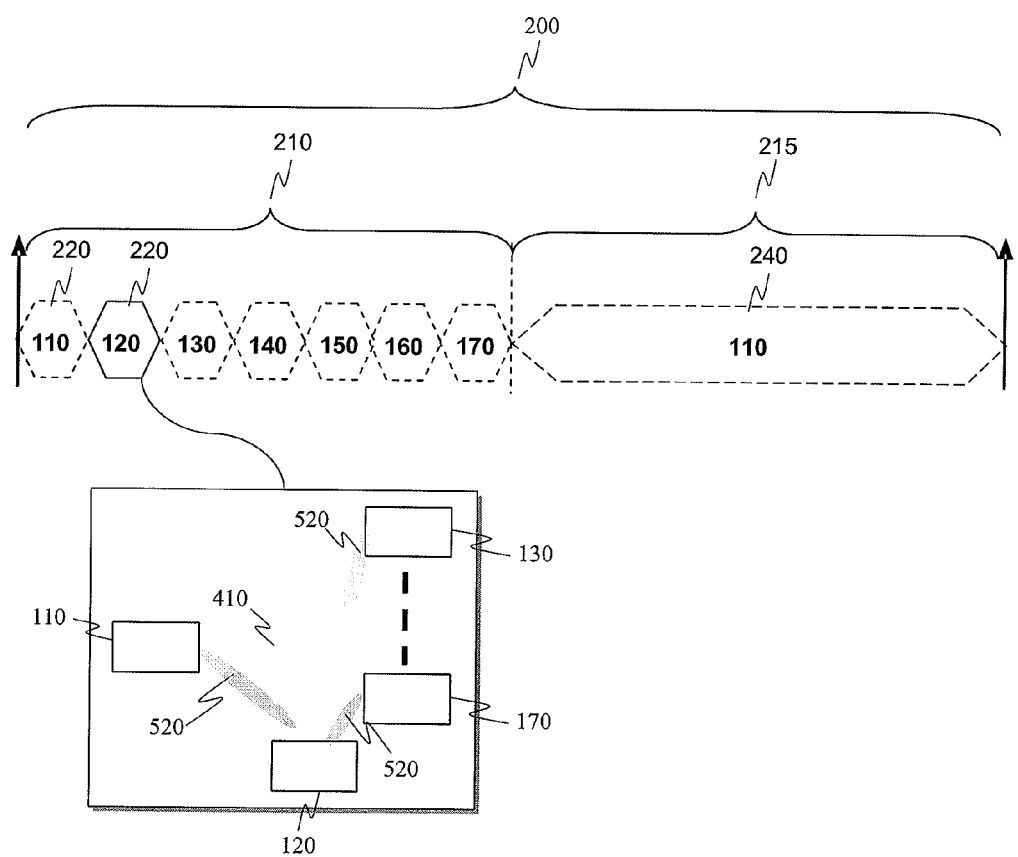
Figure 9B:
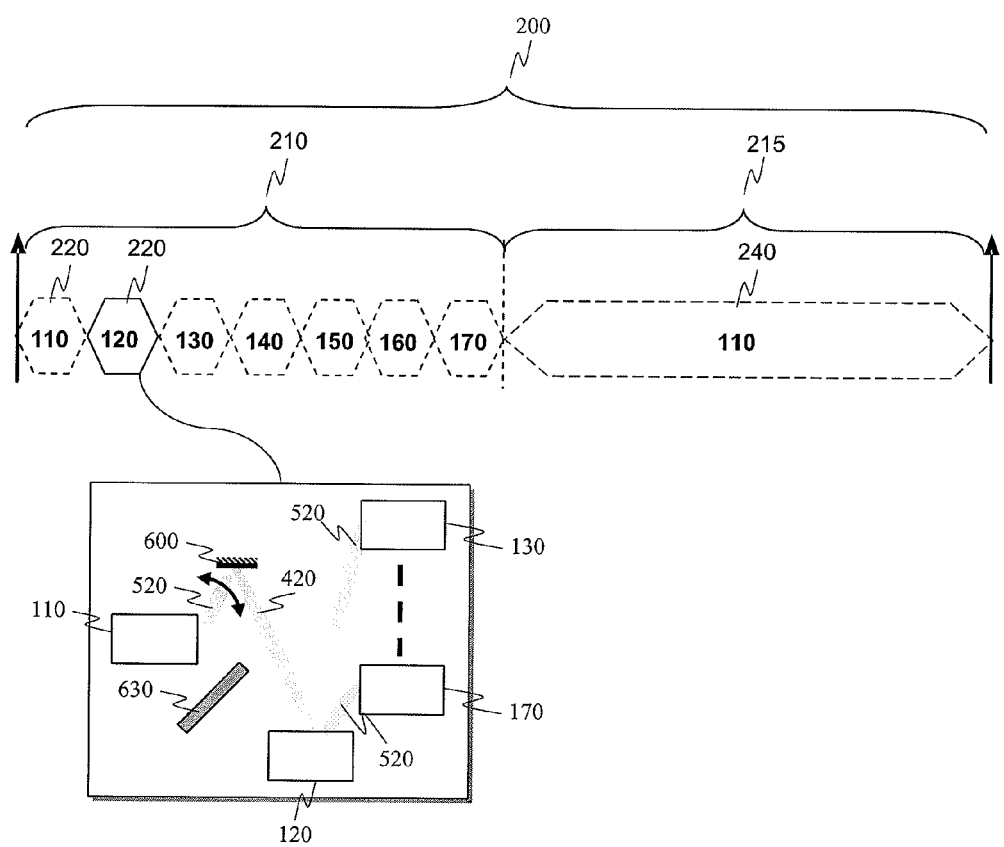
Figure 10A:
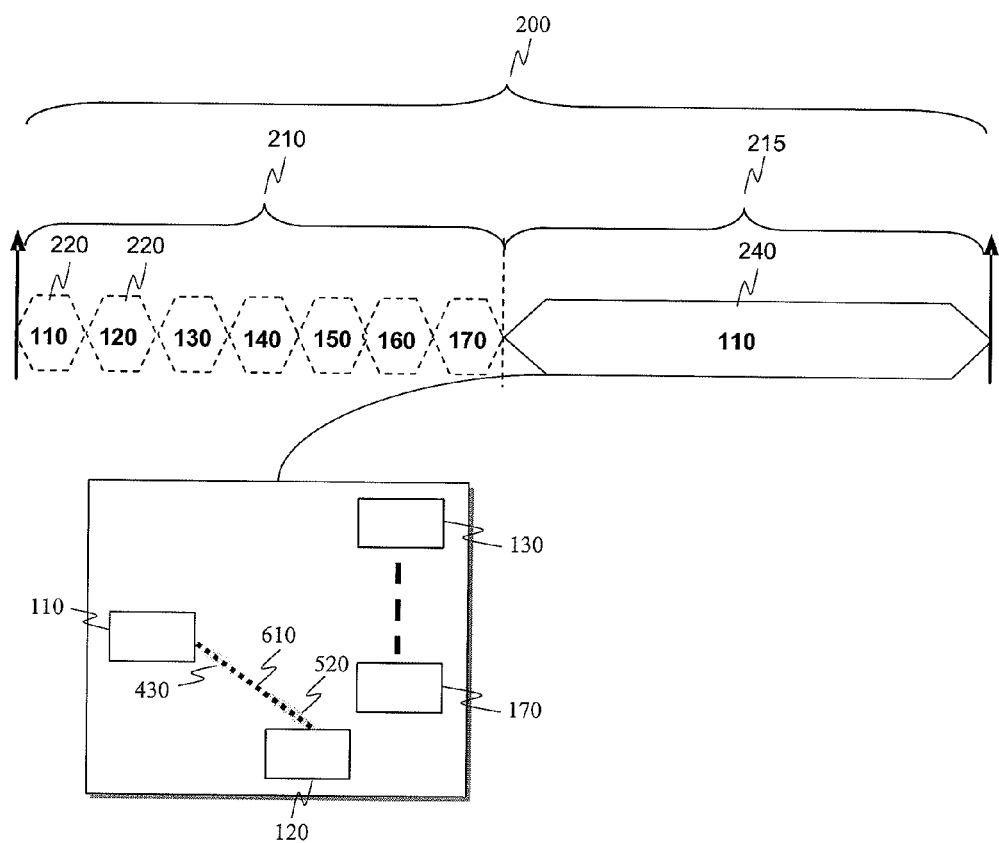
Figure 10B:
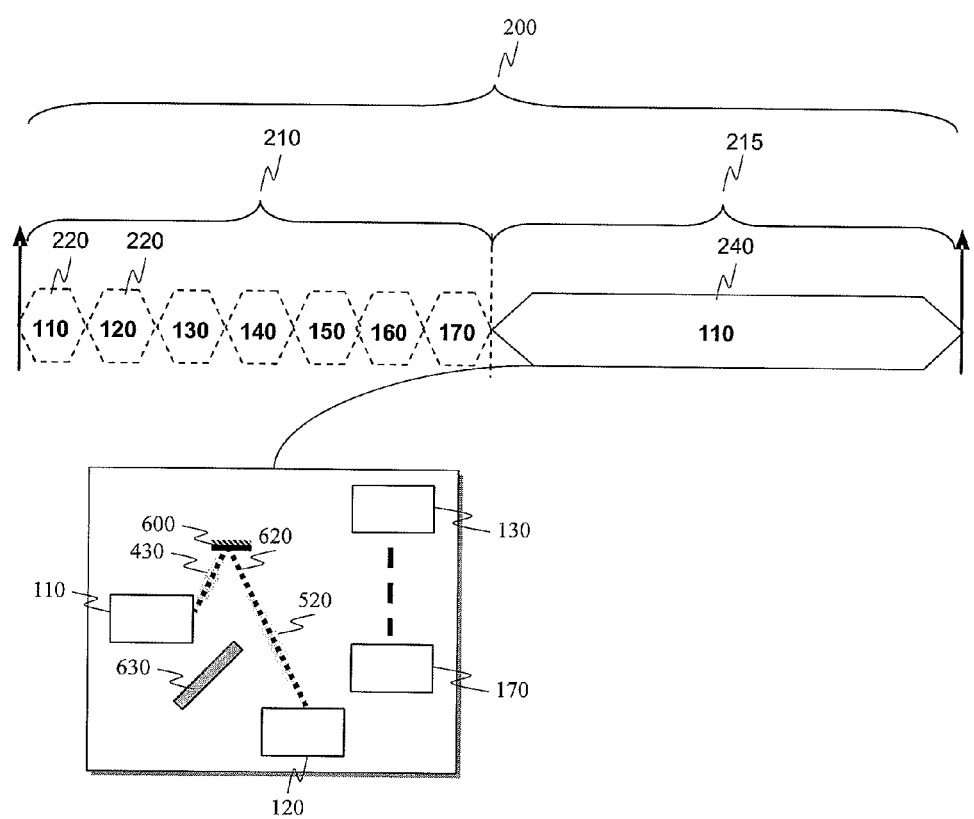
Figure 11:
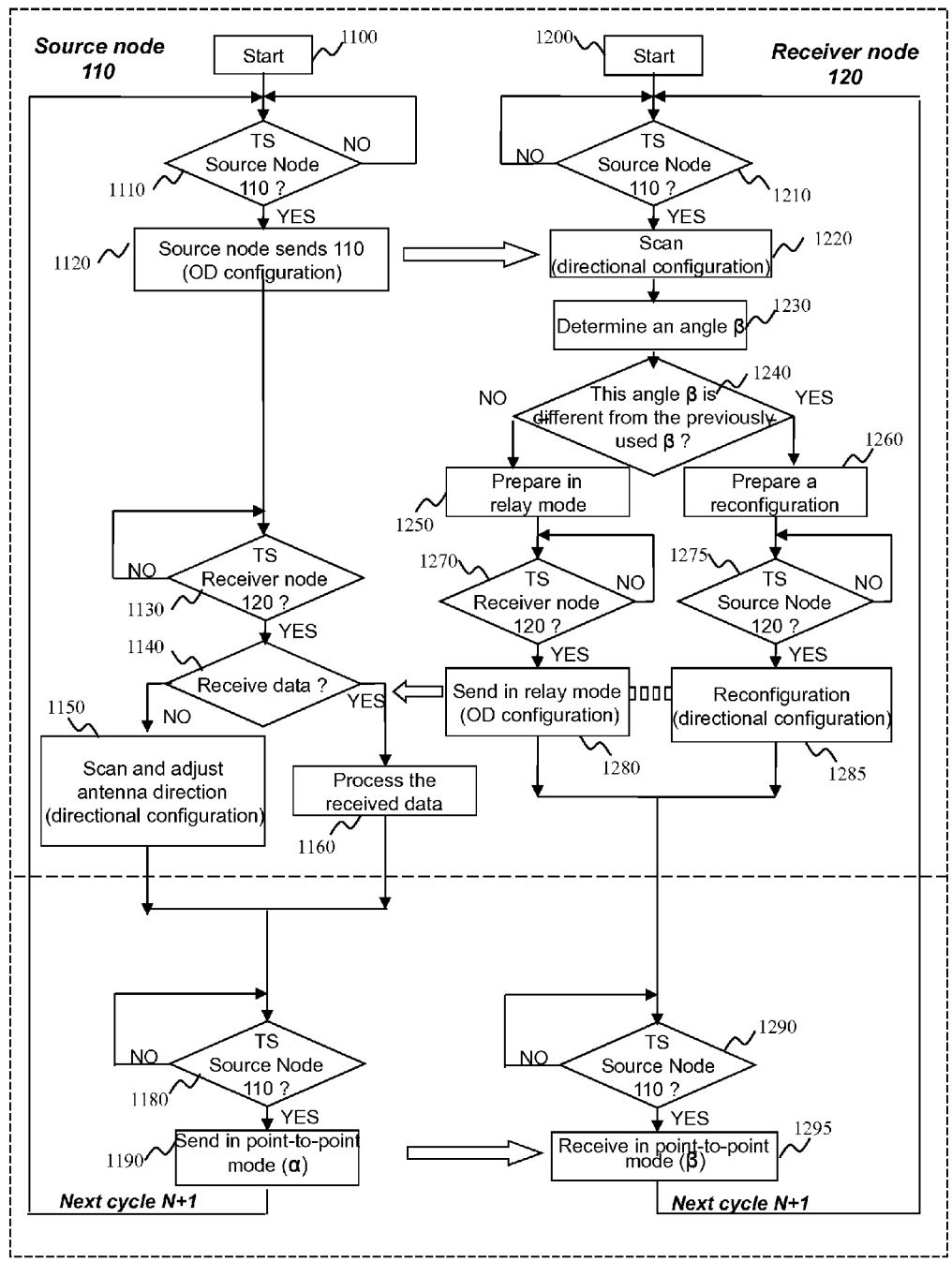

FIG. 3 presents the schematic structure of a communications device implementing the method for configuring according to a particular embodiment compliant with the invention;

FIGS. 4a and 4b each illustrate an example of a mode of operation of a sending antenna (FIG. 4a illustrates an antenna configured quasi-omnidirectionally, while FIG. 4b illustrates an antenna configured directionally);

FIG. 5 illustrates an example of a mode of operation of a reception antenna;

FIG. 6a illustrates a schematic example of a point-to-point transmission mode between a source node and a receiver node communicating alignedly;

FIG. 6b illustrates a schematic example of a transmission in point-to-point mode between a source node and a receiver node communicating non-alignedly;

FIG. 7a illustrates a communications scheme in which there is implemented a method for determining communications paths to set up a point-to-point transmission alignedly between the source node and a receiver node according to a particular embodiment of the invention;

FIG. 7b represents a curve of progress of the level of power of a signal measured by a receiver node as a function of the angle of orientation of its antenna, in the context of a determining of a communications path as presented in FIG. 7a;

FIG. 8a illustrates a communications scheme implementing a method for determining communications paths to set up a point-to-point transmission non-alignedly between a source and a receiver node according to a particular embodiment of the invention;

FIG. 8b shows a curve of progress of the power level of a signal measured by a receiver node as a function of the angle of orientation of its antenna in the context of a determining of a communications path which for its part is shown in FIG. 8a;

FIG. 9a illustrates a communications scheme in which a receiver node behaves as a communications relay according to a particular embodiment of the invention;

FIG. 9b illustrates a communications scheme in which a reconfiguration of a point-to-point transmission according to a particular embodiment of the invention is necessary;

FIG. 10a illustrates a communications scheme implementing a transmission in point-to-point mode between a source node and a receiver node communicating in an aligned manner according to a particular embodiment of the invention;

FIG. 10b illustrates a communications scheme implementing a transmission in point-to-point mode between a source node and a receiver node communicating in a non-aligned manner according to a particular embodiment of the invention;

FIG. 11 is a flowchart of a particular embodiment of the method for configuring on the source node side and receiver node side according to the invention.

6. DETAILED DESCRIPTION

In all the figures of the present document, the identical elements and steps are designated by a same numerical reference.

Figure 1:
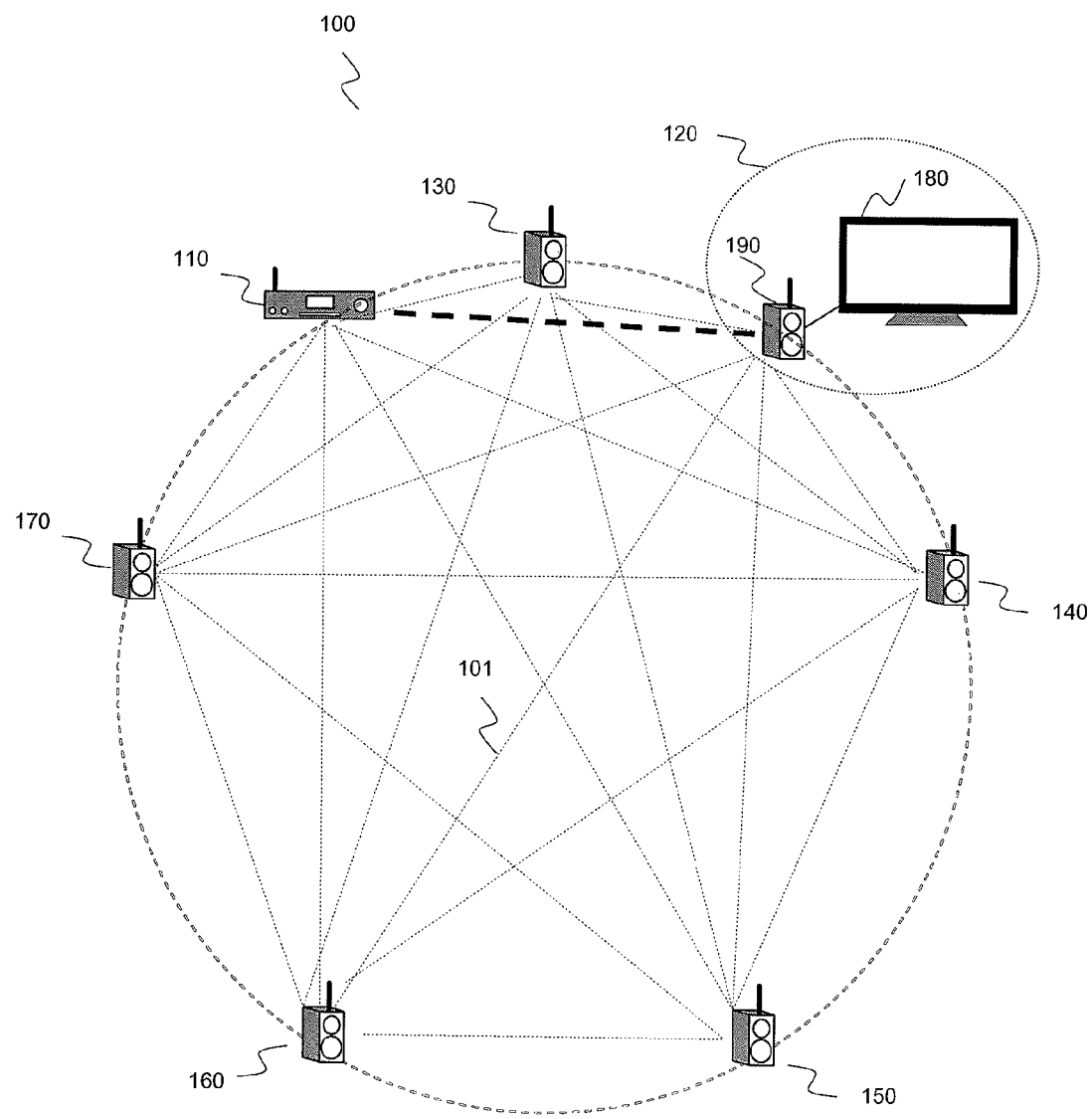
FIG. 1 illustrates an example of a wireless communications network in which it is possible for implementing the methods for configuring according to a particular embodiment compliant with the invention.

FIG. 1 is an example of a wireless communications network 100 in which the methods for configuring according to a particular embodiment compliant with the invention can be implemented.

More particularly, the network 100 of FIG. 1 illustrates a wireless (5.1 home cinema type) video and audio distribution network using millimeter waves about the 60 GHz frequency band. The network 100 comprises a source device 110 and a plurality of sender and receiver nodes 120, 130, 140, 150, 160 and 170, each node being capable of behaving alternately as a sender node and as a receiver node and having only one antenna for the transmission and reception of radio data signals. Furthermore, certain nodes may play the role of relay nodes, i.e. they retransmit on the network data that they have preliminarily received from another node. The nodes of the network 100 are all interconnected by millimeter radio communications paths 101.

It must be noted that the topology of the network 100, i.e. the relative spatial position of the nodes of the network, is deemed to be known to each of the nodes 110, 120, 130, 140, 150, 160 and 170 of the network 100 and enables the working of the mesh network according to a transmission redundancy mode.

It must be noted that the particular embodiment described here below is given by way of an illustrative example. It is clear that many other embodiments of the invention can be envisaged, without departing from the context of the invention.

During a transmission of radio data, the data stream is formed by a plurality of data blocks and is conventionally protected against transmission errors by means of an error correction code. Generally, the data blocks of the data stream are grouped together in packets at a sender node, each packet being then encoded so as to generate a plurality of parity blocks representing redundant information. A receiver device of the network 100 receiving the data packets through the different radio communications paths then carries out the decoding. This decoding step then consists in removing the errors in the data blocks received by the node device, using the parity blocks to do this.

The relay nodes for their part carry out the transfer of data packets encoded as such without decoding or again encoding the data streams.

Indeed, it is important to note that the execution of a subsequent decoding and encoding at each relay node would increase the memory consumption needed for the temporary storage of the packets and would also increase the transmission time (latency) while at the same time unnecessarily consuming computation resources.

To transmit a stream of data pertaining to an audio stream, a video stream or to a combination of the two, a protocol such as the one described by the IEEE 802.15.3 standard may, for example, be implemented. Apart from the fact that it permits very high bit rates (in its 802.15.3c version), owing to a transmission of data in the 57-64 GHz frequency band, this protocol offers each of the nodes of the network the possibility of benefitting from a time of access to the shared wireless communications medium by using time division multiplexing (TDM) providing for a division of the time domain into a plurality of recurrent time slots of fixed length, here below also called a TDM sequence or cycle. Multiplexing of this kind enables certain parameters such as the transmission latency or the bandwidth allotted to each transmission to remain non-variant.

Around the 60 GHz frequency, a similarity can be noted between the propagation of the radio waves and the propagation of light: certain obstacles (or objects) block propagation and partly reflect it. In this case, even if the radio signals are broadcast in every direction, certain relay nodes or receiver nodes of the network 100 may not be capable of detecting these radio signals owing to the presence of obstacles in the coverage zone of their antennas in reception mode.

Thus it is possible for a communications path to be incapable of being set up alignedly, i.e. in a line-of sight mode, between a sender node and a receiver owing for example to a shadowing phenomenon. However, in using certain objects (for example objects placed by an installer of the network 100) having the high capacity for reflecting radio waves, it is possible to set up a communications path non-alignedly (in non-line-of-sight mode).

Figure 2:
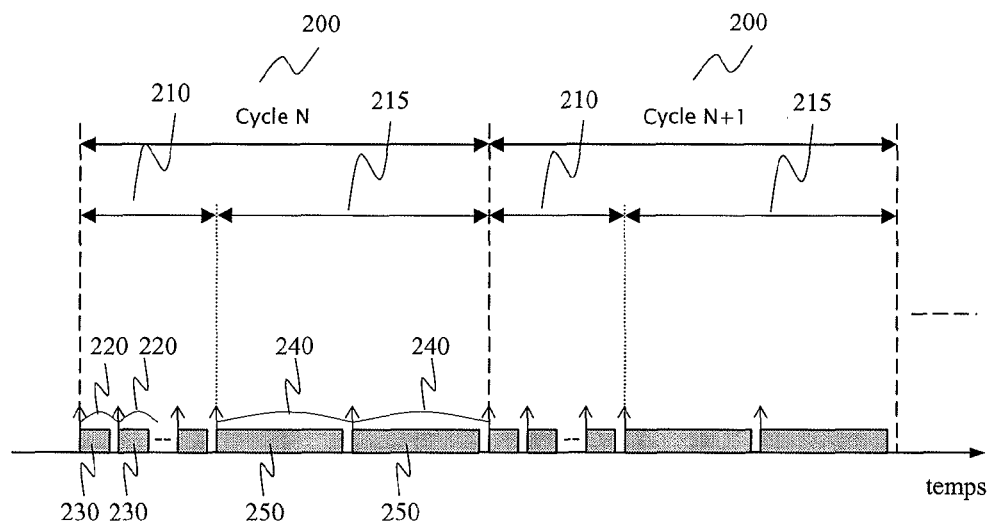
FIG. 2 illustrates an example of a synchronous physical layer using TDM (Time Division Multiplexing)

FIG. 2 illustrates an example of a synchronous physical layer using a time division multiplexing (TDM).

Classically, the time is divided into a plurality of successive network cycles (N, N+1, ...) 200 for data transmission, each network 200 comprising a first sequence 210 reserved for data transmission in a transmissions redundancy mode and a second sequence 215 reserved for data transmission in a point-to-point mode.

Thus, two transmission modes can be distinguished. The first mode, called a transmission redundancy mode corresponds to data transmission at low bit rates (as compared with the capacity of the communications network) is done according to an quasi-omnidirectional sender antenna configuration or with a very wide angular spectrum (greater for example than 90°) to reach the maximum number of nodes within the network. This increases the probability that the data will be received by nodes of the network (which can then relay this data so that all the nodes of network can ultimately receive this data). The second mode, called a point-to-point mode corresponding to data transmission at high bit rates (as compared with the capacity of the communications network) is done in a directional configuration of a sender antenna or with a narrow angular spectrum (smaller for example than 30°). In short, the transmission redundancy transmission mode using a same (or power) consumption has a radiation angle greater than that of the point-to-point transmission mode.

The sequence 210 reserved for transmission in transmission redundancy mode is shared in time to enable each node of the network to send data 230 (data generated by the node itself or an application connected to it or relayed data) during (at least) one given time slot 220 per network cycle 200, and to receive for the rest of the time (of the sequence 210).

When a node sends data on the network during its speech time 220, all the other nodes of the network use their configured antennas directionally with positive gain. This mode of operation dictates the selection of the proper antenna sector oriented to the sender node sending during the time slot 220 allotted to it. It can then be said that a node works in a directional (or selective) reception antenna configuration.

Each speech time 220 can convey zero, one or more data blocks of a data stream depending on the bit rate of this data stream and more generally depending on the data effectively to be transmitted. Thus, each of these data blocks also has a corresponding transmission time slot. It can be noted that among the data blocks, which are own data blocks or relay data blocks, there are control data blocks used for the transmission and relaying of control messages.

Each data packet can itself be divided into a plurality of packets or symbols. The relay nodes of the communications network furthermore re-transmit data blocks (called relayed blocks) intended for third-party nodes of the network so that, at the end of the cycle 200 (or of a pre-determined number of cycles 200), the data blocks received in the different time slots 200 represent different copies of the original data block. This is what is called relaying by network meshing.

The sequence 215 reserved for data transmission in point-to-point mode is shared in time to enable each node of the network to send data 250 (data generated by an application connected for example to the node, or relay data) during (at least) one given time slot 240, per network cycle 200.

When a node sends out data during its speech time 240, the receiver node involved in the point-to-point transmission uses its antenna configured directionally with a positive gain. This mode of operation dictates the selection of the appropriate antenna sector oriented to the sender node sending during the time slot 240 that is allotted to it. It is said then that a node is working according to a directional (or selective) configuration of receiving antenna.

Each time slot 240 enables the node to which this interval has been allotted to transmit zero, one or more data blocks of a data stream as a function of the bit rate of this data stream and more generally as a function of the data effectively to be sent.

FIG. 3 shows the schematic structure of a communications device 300 of the communications network 100 implementing the method for configuring according a particular embodiment of the invention.

More specifically, the communications device 300 is integrated into each of the sender or receiver devices (120, 130, 140, 150, 160, 170) or into any relay device of the communications network 100.

The communications device 300 comprises:
a RAM (Random Access Memory) 302 working as a main memory;
a computation block 301 (denoted pc for "micro-controller") or CPU (Control Process Unit) whose capacity can be extended by an optional random-access memory connected to an expansion port (not shown in FIG. 2). The CPU 301 is capable of executing instructions from the ROM 303. After the system has been powered on, the CPU 301 is capable of executing instructions from the RAM 302 pertaining to a computer program, once these instructions have been loaded from the ROM 303 or an external memory (not shown in the present FIG. 3). A computer program of this kind, if executed by the CPU 301, prompts the execution of a part or of the totality of the steps of the algorithms described here below with reference to FIG. 11.
a block 310 (denoted RF-FE or front-end) responsible for matching the output signal of the baseband block 305 (RF-BB or RF-baseband) before it is sent out by means of an antenna 304. For example, the matching can be done by frequency transposition and power amplification processes. Conversely, the block 305 also enables the matching of a signal received by the antenna 304 before it is transmitted to the baseband block 305. The baseband block 305 is responsible for modulating and demodulating the digital data exchanged with the block 310. The block 310 has a sub-block 312 (denoted as RM for Reception Measurement) constituted for example by an ADC (analog-digital converter) whose task is to measure the power of the signal received through the antenna 304, the power measurement value being then communicated to the CPU 301;
an input/output interface (I/O I/f) block 306 connected to a communications network 307.

FIGS. 4a and 4b each illustrate an example of a mode of operation of a sender antenna 400, FIG. 4a illustrating a sender antenna configured in quasi-omnidirectionally and FIG. 4b showing a sender antenna configured directionally (or selectively).

In the particular embodiment presented in FIG. 1, i.e. in the communications network 100, the sender antennas 400 may be configured either in a wide radiation angle 410 (in this case the term used is quasi-omnidirectional sender antenna configuration) or with a narrow radiation angle 420 (in this case the term used is directional sender antenna configuration).

As explained further above, each sender node of the network implements a technique of antenna directivity known as beamforming. Indeed, an increase in the power of the signal in a desired direction can be obtained by reducing the width of the radiation angle in sending mode, thus making it possible either to increase the sending distance or, for equal distances, to increase the signal-to-noise (SNR) ratio for a targeted receiver node. Such a technique thus makes it possible to improve radio signal reception quality and reduce the error rates of the transmission channel.

The orientation of the narrow radiation beam 420 is shown with an orientation angle α 430. This orientation angle α is chosen from among a set of antenna orientation angles contained in the radiation zone 410 of the antenna 400 configured quasi-omnidirectionally. In other words, the angle of orientation α can take any angle value ranging from 0 degrees to 180 degrees.

The term "angle of orientation" in the case of an agile (or smart) antenna refers to an angle for which the parameters for configuring the smart antenna matrix are such that the radiation (when sending) or the sensitivity (in reception) of the antenna is accentuated in this direction relative to the other directions.

FIG. 5 illustrates an example of a mode of operation of a receiver antenna 500.

In the particular embodiment shown in FIG. 1, i.e. in the communications network 100, the receiver antennas 500 (which are capable of corresponding to the antennas 400 if one and the same antenna is used in sending and in receiving) are always configured (i.e. whatever the mode of transmission implemented) with a narrow reception angle 520 (in this case the term used is directional configuration of receiver antenna). Indeed, as explained here above, the use of a narrow reception angle 520 increases the power of the radio signal at input of the receiver node, thus increasing the distance of transmission or, for equal distances, increasing the signal-to-noise ratio (SNR). The radio signal reception quality is thereby improved and the error rate of the transmission channel is reduced.

The orientation of the directional major lobe 520 of the receiver antenna 500 is represented by an orientation angle β 530. This angle β is selected from a set of antenna orientation angles belonging to the zone of sensitivity of the antenna 500 configured quasi-omnidirectionally. In other words, the orientation angle β may take any value of an angle ranging from 0 degrees to 180 degrees.

FIG. 6a illustrates a schematic example of transmission in point-to-point mode known as beamsteering between a source node and a receiver node communicating alignedly (in line-of-sight mode) according to a particular embodiment of the invention.

This figure considers a wireless communications system 100 as presented in FIG. 1 where the node 120 is considered to be the receiver node receiving data at high bit rates (audio and video applications for example) coming from the source device 110. The receiver node 120 is considered to be capable of receiving the audio data redirected to the node 190 (then playing then the role of speaker)) capable of working as a relay node but also capable of receiving data coming from the source node 110 and addressed to the viewing screen 180.

While the transmission of applications data at low bit rates (such as audio data) or control data is done with a quasi-omnidirectionally configured sender antenna 410, in the transmission sequence 210 reserved for the transmission redundancy mode, during the time slots 220, the transmission of applications data at high bit rates (such as video data) for its part is done with a directional configuration of sender antennas 420 in the transmission sequence 215 in point-to-point mode during the time slots 240.

Since the bandwidth required for data transmission at high bit rates, such as for example a non-compressed high definition video (requiring a bit rate of several Gbps) is high, it is not realistic to implement a communication with transmission redundancy by using relay nodes as is the case for example for the audio data. It is clear that the quality of the radio signals corresponding to video data must be boosted. One possibility is that of communicating this data in point-to-point mode, i.e. using a directional antenna configuration both on the sender side and on the receiver side.

The source node 110, in the case of FIG. 6a, uses the technique of antenna directivity or beamforming according to the principle described with reference to FIG. 4b to obtain a directional sender antenna configuration 420 and directs its sender antenna towards the receiver node 120. The receiver node 120 also uses the technique of antenna directivity to obtain a receiver antenna directional configuration 520 and directs its receive antenna towards the source node 110. In the present case, the source node 110 and receiver node 120 thus communicate alignedly (or in line-of-sight mode) through a communications path 610.

Here below, FIG. 6b illustrates a schematic example of transmission in point-to-point mode also know as beamsteering between a source node and a receiver node communicating non-alignedly (non-line-of-sight mode) in a particular embodiment of the invention.

When a communications path 610 set up alignedly (in line of sight) to convey data between the nodes of a pair of source nodes 110 (or sender node) and receiver node 120 is cut off or masked by an obstacle 630, an alternative communications path 620 can be used to transmit the data considered. The alternative communications path illustrated in the present case is obtained by reflection of the radio signal on a reflecting surface 600.

However, it must be noted that a reflective signal of this kind, owing to a greater distance of travel in air and possible absorption (or diffraction related to reflection) is (possibly very highly) attenuated before it reaches the receiver node 120. It therefore proves to be necessary to reinforce, in terms of power (or energy), the radio signal to be sent in point-to-point transmission mode. The source node 110 then also points its receiver antenna 400 in a directional receive antenna configuration to the reflective surface 600 so that the pair of nodes can communicate non-alignedly in point-to-point mode.

For the purpose of simplifying the description of the present invention, here below the description shall consider only one communications path 620 in indirect view. It is clear however that the invention can be implemented in the context of an application with a plurality of possible communications paths indirectly (where several reflective surfaces have been determined in the coverage zone of the network). In this case, the operation for measurement in reception applied to the paths for the point-to-point communications (with reference to FIG. 8a) will keep only the best path.

It can moreover be noted that only the point-to-point transmission modes in line of view and non-line of sight involving an object with a reflective surface (such as the ones presented here above with reference to FIGS. 6a and 6b) are described in detail in the present document. It is clear nevertheless that the invention can equally well apply to the case where the nodes of a pair formed by a sender node and a receiver node communicate in point-to-point mode, non-alignedly by means of one or more relay nodes, for example when the distance (in line of sight) between the nodes involved in a given communication link-up is excessively great. In this case, the principle applied here above (with reference to FIGS. 6a and 6b) for a communications path between a sender node and a receiver node also applies to each communications link included in a communications path involving at least one relay node, a communications path being formed by several communications links as a function of the number of relay nodes involved in the communication link-up considered.

FIG. 7a illustrates a communications scheme implemented a method for determining communications paths enabling point-to-point transmission alignedly between a source node 110 and a receiver node 120 according to a particular embodiment of the invention.

More particularly, such a method can be used, at each network cycle 200 and more particularly during the time slots 220 to determine a communications path to ensure a level of quality sufficient to set up point-to-point transmission between the source node 110 and receiver node 120 during at least one subsequent time slot 240.

In a preferred embodiment, the best communications path (or at least the most suitable communications path) is selected for the point-to-point transmission considered, i.e. the path for which the level of quality of data transmission between the source node 110 and the receiver node 120 is the highest.

It is important to note that such a method for determining a communications path is implemented during the transmission sequence 210 of the network cycle 200 dedicated to transmission redundancy. To this end, the nodes involved in a point-to-point transmission then benefit from this time sequence during the time slots 220 to exchange information on receiver and sender antenna configuration parameters and enable a reconfiguration of the point-to-point transmission without any need to use the bandwidth reserved for applications data of the point-to-point transmission.

During the speech time 220 reserved for it to transmit in the transmission redundancy mode, the source node 110, with a quasi-omnidirectional sender antenna configuration 410, sends the audio and control data to all the other nodes 120, 130, 140, 150, 160 and 170 of the network (these nodes thus acting as receiver nodes), each of these receivers nodes having preliminarily oriented its receiver antenna towards the source node 110 with a directional antenna configuration 520.

At the speech time 220 reserved for transmission according to the transmission redundancy mode, each of the other nodes of the network relays the data received by adding its own data there too as the case may be, such as control data for example.

For its part, the receiver node 120, also designed to receive data at high bit rates during the point-to-point transmission, during the time slot 240, may detect the fact that the communications path used hitherto between the source node 110 and the receiver node 120 is no longer suitable. For example, it may be considered that a communications path is no longer suitable when the measured level of signal power received is lower than a predefined threshold. The receiver node 120 then makes profitable use of the time slot 220 where the source node 110 is sending to measure the power level of the signal received throughout its angular range. To this end, the receiver node 120 does a scan in reception with a directional receive antenna configuration and measures the power level of the signal received by means of the sub-block 312. The scanning of the receiver antenna is done for example by making the orientation angle β vary in steps of 10 degrees in the zone of sensitivity of the antenna 500 (with a scan from 0 to 180 degrees).

It is important to note that during the scan by its reception antenna, the receiver node 120 cannot receive the data (applications data and/or control data) normally intended for it at low bit rates. However, owing to the sequence of transmission 210 reserved for transmission redundancy on the mesh network, the receiver node 120 may nevertheless subsequently receive the data intended for it by means of one or more other nodes 130, 140, 150, 160, 170 of the network which act as relays during the time slots 220 following the sending time slot allotted to the source node 110.

FIG. 7b shows a curve representing the progress of the level of signal power measured by the receiver device 120 as a function of the orientation angle of its antenna β, in the context of a determining of a communications path as shown in FIG. 7a.

In other words, FIG. 7b shows the result of measurements of the power level made by the receiver node 120, obtained after having made the scan as described here above. In the present case, the orientation angle β, representing the highest power level measured, will correspond to the angle of orientation for which the receiver node involved in the point-to-point transmission must parameterize its receiver antenna to receive the high bit rate data in efficient conditions of transmission.

Various methods known to those skilled in the art may be used to determine the angle of orientation of a receiver antenna. By way of a non-exhaustive example, it may be a classic method based on a measurement of the RSSI (Received Signal Strength Indication) level of the received signal.

FIG. 8a illustrates a communications scheme implementing a method for determining communications paths enabling point-to-point transmission non-alignedly (or in line-of-sight mode) between a source node 110 and a receiver node 120 according to a particular embodiment of the invention.

FIG. 8a more particularly illustrates the case where an obstacle (or object) 630 masks the communications path 610 set up alignedly (or in line-of-sight mode) between the sender node 110 and the receiver node 120 but where, on the contrary, a reflective surface 600 enables the reflection of the radio signal coming from the sender node 110 to the receiver node 120.

In the present case, a process strictly identical to the one presented here above with reference to FIG. 7a can be implemented to perform the steps of searching for and determining a communications path for a future point-to-point transmission non-alignedly (i.e. in non-line-of-sight mode).

Here again, it is important to note that, during the scan performed by its receiver antenna, the receiver node 120 cannot receive the data (audio and control data) intended for it. However, through the transmission sequence 210 reserved for a transmission redundancy, in other words according to the principle of relaying by network meshing, the receiver node 120 may nevertheless receive data intended for it through one or more other nodes 130, 140, 150, 160, 170 of the network which act as relays during the time slots 220 following the sender time slot allocated to the source node 120.

FIG. 8b shows a curve corresponding to the progress of the signal power level measured by the receiver node 120 as a function of the orientation angle of its antenna β, in the context of a determining of a communications path as represented in FIG. 8a.

FIG. 8b presents the results of measurements of the power level at reception made by the receiver node 120 obtained after scanning by its receiver antenna. In the present case, the angle of orientation β, representing the highest measured power level, corresponds to the angle of orientation for which the receiver node involved in the point-to-point transmission must parameterize its receiver antenna to receive the data at high bit rates in the right conditions of transmission. The angle of orientation corresponding to the aligned or line-of-sight transmission no longer corresponds to the best angle of antenna orientation owing to the presence of an obstacle 630 highly attenuating the communication, done alignedly, between the source node 110 and the receiver node 120 or entirely masking it. Indeed, point-to-point transmission must be done in the present case non-alignedly, via the communications path 620 involving the reflective surface 600.

FIG. 9a illustrates a communications scheme in which a receiver node 120 behaves like a communications relay according to a particular embodiment of the invention.

If, during the scan by its receiver antenna, i.e. during the time slot 220 allotted to the source node 110 for transmission in the transmission redundancy mode, the receiver node 120 detects no variation in its reception configuration parameters. In other words if the receiver antenna orientation angle β determined during the previous network cycle (or during a previous network cycle) is identical to that of the current network cycle, then the receiver node 120 will work like a relay node during the time slot 220 reserved to it to make transmission in the transmission redundancy mode. To this end, the receiver node can start this scan by its receiver antenna in testing to see if the reception configuration parameters used during the previous cycle (or from a previous cycle) enable a reception of data sent by the receiver node 110 in the right conditions.

During the time slot 220 reserved to it for transmission according to the transmission redundancy mode, the receiver node 120 therefore, with a quasi-omnidirectional sender antenna configuration, transmits audio and/or control data 230 to all the other nodes of the network 110, 130, 140, 150, 160 and 170 (all then acting as receiver nodes), each of these receiver nodes having preliminarily oriented its antenna, with a directional receiver antenna configuration, towards the receiver node 120 (then acting as a relay node during the time slot 220 dedicated to it). The pieces of radio data 230 thus transmitted (or relayed) may themselves come from a relay node (depending on the position of the time slot 220 allocated to the receiver node 120 in the TDM sequence of the network cycle 200.

FIG. 9b illustrates a communications scheme in which a reconfiguration of the point-to-point transmission according to a particular embodiment of the invention is necessary.

If, during the scan by its receiver antenna, i.e. during the time slot 220 reserved for the source node 110 to make transmission in the transmission redundancy mode, the receiver node 220 detects a variation of its receiver antenna angular configuration parameters, in other words, if the angle of antenna orientation in reception β (enabling good reception of data sent by the source node 110) determined during the current network cycle differs from the one determined during the previous network cycle (or from a previous network cycle), then it is necessary to reconfigure the sending antenna parameters and the receiving antenna parameters for the point-to-point transmission pertaining to the current network cycle 200. Such a configuration is here below called a configuration of a point-to-point transmission.

Hence, it is only when a change in conditions of propagation of radio waves between the pair formed by the source node 110 and the receiver node 120 is detected by the receiver node 120, that this receiver node cannot function classically like the relay node of the network cycle 200 in progress (according to the principle described in detail further above with reference to FIG. 9a).

To reconfigure a point-to-point transmission, the receiver node 120, during a time interval 220 reserved for it to transmit in the transmission redundancy mode, sends a predetermined radio signal with a directional sender antenna configuration 420. During this same time slot 220, all the other nodes 110, 130, 140, 150, 160 and 170 orient their receiver antenna according to a directional antenna configuration towards the sender node 120.

The source node 110 which waits normally to receive a radio signal from the receiver node 120 containing data from the receiver node 120 (i.e. as if the receiver node 120 were to work as a relay node), effectively receives no signal because the receiver node 120 sends in a directional antenna configuration and because the receiver antenna of the sender node 120 (which too is in directional configuration) is not correctly oriented. Then, the source node 110 must search for an antenna orientation to receive the radio signal sent by the receiver node 120 accurately, the signal being possibly reflected by reflecting surface 600.

To this end, the sender 110 then in turn performs a scan by means of its receiver antenna according to a directional antenna configuration 520 and determines an angle of orientation β enabling it to receive the predetermined radio signal coming from the receiver node 120 optimally. This receiver antenna orientation angle β henceforth corresponds to the angle of sender antenna orientation α to be used by the source node 110 for transmitting in point-to-point mode to the receiver node 120 during the time slot 240 reserved for this purpose. The parameters for the configuration of the sender antenna by the point-to-point transmission are then determined as a function of the parameters for the configuration of the receiver antenna used by the source node 110 when the receiver node 120 sends in a directional antenna configuration. To determine parameters for configuration of the reception antenna enabling point-to-point communication between the source node 100 and receiver node 120, the source node 110 can for example measure the received radio signal by means of the sub-block 310 in making the reception angle β vary by 10-degree steps throughout its zone of sensitivity at reception, ranging from 0 to 180 degrees. For example it then selects the angle β giving it the best signal power level measured at reception.

Although the point-to-point transmission takes place during the time slot 240 of the cycle 200, the configuration parameters of the antennas aimed at obtaining a reconfiguration of the point-to-point transmission are determined therefore solely during the transmission sequence 210 reserved for transmission redundancy.

FIG. 10a illustrates a communications scheme implementing a point-to-point mode of transmission between the source node 110 and a receiver node 120 communicating alignedly according to a particular embodiment of the invention.

After a prior determining of the receiving and sending antenna configuration parameters (which have remained unchanged relative to the previous cycle 200 or else been readjusted relative to the previous cycle 200) intended for point-to-point transmission, during the transmission sequence 210 reserved for transmission redundancies of the current cycle 200, the source node 110 and receiver node 120 proceed as follows:

the source node 110 sends in point-to-point mode, with a directional antenna configuration 420, at an angle of orientation α towards the receiver node 120;

the receiver node 120 (the intended recipient of the high bit rate applications data) receives in point-to-point mode with a directional antenna configuration 520 according to the angle α 530 towards the source node 110.

FIG. 10b illustrates a communications scheme implementing a point-to-point mode transmission between a source node 110 and a receiver node 120 communicating non-alignedly (in non-line-of-sight mode) according to a particular embodiment of the invention.

After a prior determining of the receiver and sending antenna configuration parameters (which have remained unchanged relative to the cycle 200 above or else been readjusted relative to the cycle 200 above) intended for point-to-point transmission during the transmission sequence 210 reserved for the transmission redundancy of the current cycle 200, the source node 110 and receiver node 120 proceed as follows:

the source node 110 sends in point-to-point mode, with a directional antenna configuration 420, at the angle of orientation α towards reflecting surface 600;

the receiver node 120 (the intended recipient of the high bit rate applications data) receives in point-to-point mode with a directional antenna configuration 520 according to the angle α 530 towards the source node 110.

Referring now to FIG. 11, a flowchart is presented of a particular embodiment of the method for configuring on the source node 110 side and the receiver node 120 side, according to the invention.

This algorithm more particularly synthesizes the running of the different steps needed for adjusting the antenna configuration parameters used by the source node 110 and receiver node 120 for point-to-point transmission.

To facilitate the reading of this flowchart, all the steps implemented by the source node 110 and receiver node 120 are represented in a same figure, the configuration algorithm on the source node (or sender node) side being described on the left hand part of FIG. 11 (steps 1100 to 1190) and that of the receiver node side is described in the right hand part of FIG. 11 (steps 1200 to 1295). The steps 1010, 1020, respectively constitutes steps of initializing the algorithm of the source node 110 and receiver node 120.

Then, the algorithm implemented by each of the nodes namely the source node 110 and receiver node 120 respectively passes to a step 1110 and a step 1210 in each of which the time slot 220 (denoted as TS in the figure for time slot) allotted to the source node 110 for transmitting according to the transmission redundancy mode is awaited. Indeed, the TDM sequence of the network cycle 220, i.e. the order in which each node sends its data, is known to all the nodes of the network.

At a step 1120, the source node 110 sends the low bit-rate data (audio applications and/or control data) intended for the nodes 120 to 170 with a quasi-omnidirectional sending antenna configuration (referenced OD in the figure for "(quasi-) omnidirectional").

For its part, the receiver node 120, at a step 1220, makes a search in a communications path enabling it to receive data sent by the source node 110 properly. The receiver node 120 to this end makes a scan at reception, using its antenna 500 according to a directional reception antenna configuration in the zone of sensitivity of the antenna 500.

At a step 1230, the receiver antenna 120, from all the orientation angles included in the zone of sensitivity of the antenna 500, selects an orientation angle β for which the level of quality at reception measured (for example the RSSI level) is suited to receiving data sent by the source node 110.

At a step 1240, the receiver node 120 then makes a check to see if this angle β is different from the one selected in the previous network cycle 200. In other words, it makes a check to see if a change has been detected in the conditions of propagation of a radio signal for the communications of the pair of nodes formed by the source node 110 and receiver node 120.

If no change is detected, the receiver node 120 (then acting as a relay node) gets ready at a step 1250 to re-send the data previously received from the other nodes 130 to 170 (involving participation in the relay by network meshing according to the first mode of transmission) by adding its own data as the case may be, for example control data. At a step 1270, the receiver node 120 awaits the arrival of the time slot 220 which is allotted to it for transmission according to the transmission redundancy mode, during a step 1280, using a quasi-omnidirectional sender antenna configuration.

If a change is detected, i.e. if the result of the test performed at the step 1240 is positive (i.e. the angle β of the current network cycle is different from the angle β of the previous network cycle), the receiver node 120 gets ready, at a step 1260, for a reconfiguration of the antenna angle parameters for the point-to-point transmission. At a step 1275, the receiver node 120 awaits the arrival of the time slot 220 allotted to it for transmission according to the transmission redundancy mode. Then, at a step 1285, it sends out a predetermined signal using sender antenna configuration parameters determined as according to the receiver antenna configuration parameters corresponding to the angle β determined at the step 1230.

For its part, after having sent the data intended for the nodes 120 to 170 at the step 1120, the source node 110, at the step 1130, awaits the arrival of the time slot 220 allotted to the receiver node 120 for sending its data according to the transmission redundancy mode.

In this time slot 220, the source node 110, at a step 1140, orients its receiver antenna with a directive configuration according to the angle of orientation β used in the previous network cycle, and then performs a measurement of power level in this direction in order to make a test to check that the data sent out by the receiver node 120 has been well received.

If the result of the test 1140 is positive (with adequate reception of data), the source node 110 then (at a step 1160) processes the data received during the transmission redundancy communications part without changing the antenna orientation angle β of the sender node 110.

If the result of this test 1140 is negative (inadequate reception of data or non-reception of data), the source node 110 then tries, at a step 1150, to determine the receiver antenna configuration parameters defining an orientation angle β to be used to receive the predetermined radio signal sent by the receiver node 120. To this end, the source node 110 does a scan in reception in the sensitivity zone of its antenna 500 with an antenna directional configuration until it detects the predetermined radio signal sent by the receiver node 120.

Then, at the step 1180, the source node 110 awaits the arrival of the transmission time slot 240 allotted to it to send its applications data at a high bit rate in the point-to-point transmission mode.

During this time slot 240, the source node 110, at a step 1190, sends the applications data at high bit rate to the receiver node 120, in point-to-point mode, by orienting its sender antenna at the orientation angle α with a directional configuration. Depending on the result of the test performed at the step 1140, this configuration is either the configuration used at the previous cycle for the same point-to-point data transmission or a configuration defining an antenna orientation angle corresponding to the one determined at the step 1150.

Following the steps 1280 and 1285, the receiver node 120 awaits the arrival of the time slot 440 allotted to the source node 110 during which this source node sends its applications data at high bit rate in point-to-point mode in the point-to-point communications part.

During this time slot 440, the receiver node 120 may, at a step 1295, receive the applications data at high bit rate sent by the source node 110 in point-to-point mode, using its reception antenna oriented according to the angle β and configured in directional mode. Depending on the result of the test performed at the step 1240, this configuration is either the configuration used in the previous cycle for this same point-to-point data transmission or a configuration defining an antenna orientation angle corresponding to the one determined at the step 1220.

At the end of the steps 1190 and 1295, the algorithm implemented by the source and receiver nodes 110 and 120 returns to the steps (respectively numbered 1110 and 1210) of waiting for the time slot 220 allotted to the source node 110 for sending its data according to the transmission redundancy mode.

According to a particular embodiment of the invention, the configuration methods may be implemented systematically at each network cycle 200.

According to a first variant, the configuration methods may be implemented as a function of a timer such as for example after the elapsing of a determined period corresponding to a determined number of network cycles 200.

In a second variant, the configuration methods may be implemented upon detection of a level of quality of communication for a pair of nodes involved in a point-to-point transmission, below a predetermined threshold.

The invention claimed is:

1. A method for changing an antenna configuration, wherein data is transmitted between a first node and a second node according to either a first mode or a second mode, said method comprising:
   scanning by the second node for a signal which was sent by the first node according to the first mode, wherein an antenna radiation angle associated with the first mode is greater than an antenna radiation angle associated with the second mode;
   determining, based on reception of the signal sent by the first node according to the first mode, a receiving configuration of an antenna of the second node which is suitable for receiving data sent by the first node according to the second mode;
   verifying whether the determined receiving configuration is different from a receiving configuration which was used to receive an earlier signal sent by the first node according to the second mode; and
   if the determined receiving configuration is different from the receiving configuration which was used to receive the earlier signal, changing the receiving configuration of the antenna of the second node based upon the determined receiving configuration.

2. The method according to claim 1, wherein the method further comprises:
   sending a predetermined signal by the second node according to the second mode using a sending configuration that is determined based on the changed receiving configuration of the antenna so that the first node changes a receiving configuration of an antenna of the first node.

3. The method according to claim 2, wherein the method is implemented in a wireless communications network which is clocked by transmission cycles,
   wherein the first mode is a redundancy of transmissions mode and the second mode is a point-to-point transmission mode,
   wherein each transmission cycle is divided into time slots including a first time slot, a second time slot, and a third time slot,
   wherein data is transmitted from the first node to the second node according to the first mode during the first time slot, data is transmitted from the second node to the first node according to the first mode during the second time slot, and data is transmitted from the first node to the second node according to the second mode during the third time slot, and
   wherein the determining step and the verifying step are performed during the first time slot, the sending step is performed during the second time slot, and the changing step is performed during the third time slot.

4. The method according to claim 1, wherein the determined receiving configuration includes at least one of the following:
   an angle of antenna orientation in reception;
   a piece of information representing an angle of antenna orientation in reception; and
   pieces of information on gain and phase of each elementary antenna of an array of antennas forming the antenna of the second node accentuating the sensitivity in reception of said antenna at a given angle of orientation.

5. The method according to claim 1, wherein the method further comprises a step of initializing said step of determining a receiving configuration of the antenna of the second node if at least one of the following conditions is met:
   detecting a change of transmission cycle;
   detecting whether a predetermined duration, starting from a predetermined event, has elapsed; and
   detecting a level of quality of reception of data sent by the first node below a predetermined threshold.

6. The method according to claim 1, wherein said step of determining a receiving configuration of the antenna of the second node comprises steps of:
   scanning, at reception, a plurality of angles of antenna orientation;
   obtaining a level of quality of reception associated with each of said angles of antenna orientation; and
   determining the receiving configuration which is suitable for receiving data sent by the first node according to the second mode by selecting a configuration corresponding to an angle of antenna orientation, from among said plurality of angles, for which the associated level of quality of reception is the best.

7. The method according to claim 1, wherein the method further comprises, if the determined receiving configuration is not different from the receiving configuration which was used to receive the earlier signal, steps of:
   sending by the second node preliminarily received data and/or new data according to the first mode; and
   changing the antenna configuration of the second node using the receiving configuration which was used to receive the earlier signal transmitted by the first node to the second node according to the second mode.

8. A method for changing an antenna configuration, wherein data is transmitted between a first node and a second node according to either a first mode or a second mode, said method comprising:
   verifying, by the first node, whether a signal sent by the second node is detected with an acceptable reception using a first receiving configuration of an antenna of the first node which was used to receive an earlier signal sent by the second node according to the first mode, wherein an angle of antenna radiation associated with the first mode is greater than an antenna radiation angle associated with the second mode;
   if the signal sent by the second node is not detected using the first receiving configuration which was used to receive the earlier signal, scanning by the first node for a predetermined signal which was sent by the second node according to the second mode, and determining a second receiving configuration of the antenna of the first node which has an acceptable reception of the predetermined signal; and changing a sending configuration of the antenna of the first node based on the determined second receiving configuration.

9. The method according to claim 8, wherein the method is implemented in a wireless communications network which is clocked by transmission cycles, wherein the first mode is a redundancy of transmissions mode and the second mode is a point-to-point transmission mode, wherein each transmission cycle is divided into time slots including a first time slot, a second time slot, and a third time slot, wherein data is transmitted from the first node to the second node according to the first mode during the first time slot, data is transmitted from the second node to the first node according to the first mode during the second time slot, and data is transmitted from the first node to the second node according to the second mode during the third time slot, and wherein the verifying step and the determining step are performed during the second time slot, and the changing step is performed during the third time slot.

10. The method according to claim 8, wherein the sending configuration includes at least one of the following:

a sending antenna orientation angle;

a piece of information representing an angle of sending antenna orientation; and a piece of information on gain and phase of each elementary antenna included in an antenna network constituting the antenna of the first node accentuating the radiation of said antenna according to a given orientation angle.

11. A non-transitory computer readable storage medium which stores instructions executable by a computer, wherein data is transmitted between a first node and a second node according to either a first mode or a second mode, and wherein the instructions when executed by the computer perform the following:

scanning by the second node for a signal which was sent by the first node according to the first mode, wherein an antenna radiation angle associated with the first mode is greater than an antenna radiation angle associated with the second mode;

determining, based on reception of the signal sent by the first node according to the first mode, a receiving configuration of an antenna of the second node which is suitable for receiving data sent by the first node according to the second mode;

verifying whether the determined receiving configuration is different from a receiving configuration which was used to receive an earlier signal sent by the first node according to the second mode; and if the determined receiving configuration is different from the receiving configuration which was used to receive the earlier signal, changing the receiving configuration of the antenna of the second node based upon the determined receiving configuration.

12. A non-transitory computer readable storage medium which stores instructions executable by a computer, wherein data is transmitted between a first node and a second node according to either a first mode or a second mode, and wherein the instructions when executed by the computer perform the following:

verifying, by the first node, whether a signal sent by the second node is detected with an acceptable reception using a first receiving configuration of an antenna of the first node which was used to receive an earlier signal sent by the second node according to the first mode, wherein an angle of antenna radiation associated with the first mode is greater than an antenna radiation angle associated with the second mode;

if the signal sent by the second node is not detected using the first receiving configuration which was used to receive the earlier signal, scanning by the first node for a predetermined signal which was sent by the second node according to the second mode, and determining a second receiving configuration of the antenna of the first node which has an acceptable reception of the predetermined signal; and changing a sending configuration of the antenna of the first node based on the determined second receiving configuration.

13. A second node, wherein data is transmitted between a first node and the second node according to either a first mode or a second mode, the second node comprising:

a microcontroller or processor; and a memory storing instructions that, when executed by the microcontroller or processor, cause the second node to:

scan for a signal which was sent by the first node according to the first mode, wherein an antenna radiation angle associated with the first mode is greater than an antenna radiation angle associated with the second mode;

determine, based on reception of the signal sent by the first node according to the first mode, a receiving configuration of the antenna of the second node which is suitable for receiving data sent by the first node according to the second mode;

verify whether the determined receiving configuration is different from a receiving configuration which was used to receive an earlier signal sent by the first node according to the second mode; and change the receiving configuration of the antenna of the second node based upon the determined receiving configuration, when the determined receiving configuration is different from the receiving configuration which was used to receive the earlier signal.

14. The second node according to claim 13, wherein the memory stores instructions that, when executed by the microcontroller or processor, cause the second node to send a predetermined signal according to the second mode using a sending configuration that is determined based on the changed receiving configuration of the antenna so that the first node changes a receiving configuration of an antenna of the first node.

15. The second node according to claim 13, wherein the second node is comprised in a wireless communications network which is clocked by transmission cycles, wherein the first mode is a redundancy of transmissions mode and the second mode is a point-to-point transmission mode, wherein each transmission cycle is divided into time slots including a first time slot, a second time slot, and a third time slot, wherein data is transmitted from the first node to the second node according to the first mode during the first time slot, data is transmitted from the second node to the first node according to the first mode during the second time slot, and data is transmitted from the first node to the second node according to the second mode during the third time slot, and wherein the determination and the verification are performed during the first time slot, the sending is performed during the second time slot, and the changing is performed during the third time slot.

16. The second node according to claim 13, wherein the determined receiving configuration includes at least one of the following:
   an angle of antenna orientation in reception;
   a piece of information representing an angle of antenna orientation in reception; and
   pieces of information on gain and phase of each elementary antenna of an array of antennas forming the antenna of the second node accentuating the sensitivity in reception of said antenna at a given angle of orientation.

17. The second node according to claim 13, wherein the memory stores instructions that, when executed by the microcontroller or processor, cause the second node to verify a condition including at least one of the following:
   a change of transmission cycle;
   a flow of a predetermined duration starting from a predetermined event; and
   a level of quality of reception of data sent by the first node below a predetermined threshold, and wherein the determining of a receiving configuration of the antenna is activated when at least one of the conditions is verified.

18. The second node according to claim 13, wherein the memory stores instructions that, when executed by the microcontroller or processor, cause the second node to:
   scan, at reception, a plurality of angles of antenna orientation;
   obtain a level of quality of reception associated with each of said angles of antenna orientation; and
   determine the receiving configuration which is suitable for receiving data sent by the first node according to the second mode by selecting a configuration corresponding to an angle of antenna orientation, from among said plurality of angles, for which the associated level of quality of reception is the best.

19. The second node according to claim 13, wherein the memory stores instructions that, when executed by the microcontroller or processor, cause the second node, when the determined receiving configuration is not different from the receiving configuration which was used to receive the earlier signal, to:
   send preliminarily received data and/or new data according to the first mode; and
   configure the antenna of the second node by using said receiving configuration, previously used for receiving data transmitted by the first node to the second node according to the second mode.

20. A first node, wherein data is transmitted between the first node and a second node according to either a first mode or a second mode, the first node comprising:
   a microcontroller or processor; and
   a memory storing instructions that, when executed by the microcontroller or processor, cause the second node to:
   verify whether a signal sent by the second node is detected with an acceptable reception using a first receiving configuration of an antenna of the first node which was used to receive an earlier signal sent by the second node according to the first mode, wherein an antenna radiation angle associated with the first mode is greater than an antenna radiation angle associated with the second mode;
   scan for a predetermined signal which was sent by the second node according to the second mode, when the signal sent by the second node is not detected using the receiving configuration which was used to receive the earlier signal;
   determine a second receiving configuration of the antenna of the first node which has an acceptable reception of the predetermined signal; and
   change a sending configuration of the antenna of the first node based on the determined second receiving configuration.

21. The first node according to claim 20, wherein the first node is comprised in a wireless communications network which is clocked by transmission cycles,
   wherein the first mode is a redundancy of transmissions mode and the second mode is a point-to-point mode,
   wherein each transmission cycle is divided into time slots including a first time slot, a second time slot, and a third time slot,
   wherein data is transmitted from the first node to the second node according to the first mode during the first time slot, data is transmitted from the second node to the first node according to the first mode during the second time slot, and data is transmitted from the first node to the second node according to the second mode during the third time slot, and
   wherein the verification and the determination are performed during the second time slot, and the changing is performed during the third time slot.

22. The first node according to claim 20, wherein the sending configuration includes at least one of the following:
   a sending antenna orientation angle;
   a piece of information representing an angle of sending antenna orientation; and
   a piece of information on gain and phase of each elementary antenna included in an antenna network constituting the antenna of the first node accentuating the radiation of said antenna according to a given orientation angle.

* * * * *